United States Patent
Yasui et al.

(10) Patent No.: US 6,992,453 B2
(45) Date of Patent: Jan. 31, 2006

(54) ACTUATOR CONTROL SYSTEM

(75) Inventors: Yuji Yasui, Wako (JP); Kanako Shimojo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 10/992,831

(22) Filed: Nov. 22, 2004

(65) Prior Publication Data

US 2005/0110449 A1 May 26, 2005

(30) Foreign Application Priority Data

Nov. 25, 2003 (JP) ........................ 2003-394401

(51) Int. Cl.
*G05B 11/01* (2006.01)

(52) U.S. Cl. ................... 318/560; 318/632; 318/638; 318/53; 700/66; 700/54

(58) Field of Classification Search ................ 318/560, 318/568.22, 632, 638, 34, 53; 700/66, 71, 700/54
See application file for complete search history.

(56) References Cited

U.S. PATENT DOCUMENTS

| | | | | |
|---|---|---|---|---|
| 3,777,243 A | * | 12/1973 | Taguchi et al. | 318/621 |
| 4,914,366 A | * | 4/1990 | Yuasa et al. | 318/612 |
| 4,940,924 A | * | 7/1990 | Mizuno et al. | 318/560 |
| 5,164,931 A | * | 11/1992 | Yamaguchi et al. | 369/44.29 |
| 5,847,527 A | * | 12/1998 | Iwashiro | 318/561 |
| 6,664,752 B2 | * | 12/2003 | Kanayama et al. | 318/639 |
| 6,714,842 B1 | * | 3/2004 | Ito | 700/302 |

FOREIGN PATENT DOCUMENTS

JP 2004-211717 7/2004

* cited by examiner

*Primary Examiner*—Rina Duda
(74) *Attorney, Agent, or Firm*—Charles M. Marmelstein

(57) ABSTRACT

An actuator control system restrains hindrance to an object under control by an interfering substance that exists on its traveling path when the object is moved toward a target position on one axis while the object has been positioned at a target position on the other axis. A selection controller sets a switching function setting parameter (VPOLE_sl) so that a disturbance suppressing capability level is lower at a set value (VPOLE_sl_l) at time ($t_{31}\sim$) when a shift arm is moved in a shifting direction by a shift controller than at a set value (VPOLE_sl_h) at time ($\sim t_{31}$) when the shift arm is moved in a selecting direction to be set at a certain gearshift position (|VPOLE_sl_h|<|VPOLE_sl_l|).

4 Claims, 21 Drawing Sheets

FIG. 3
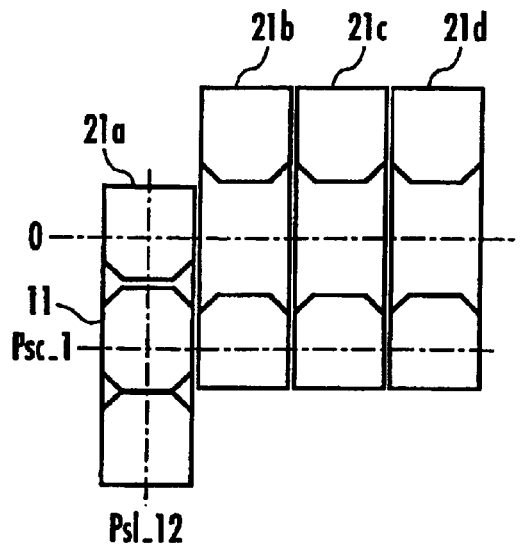
(a) 2ND GEAR IN USE
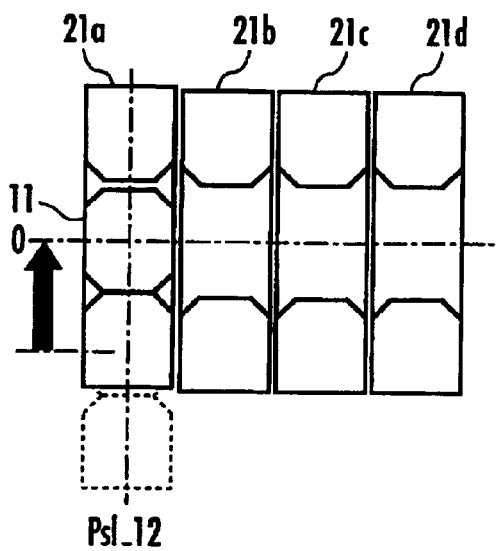
(b) DISENGAGE 2ND GEAR
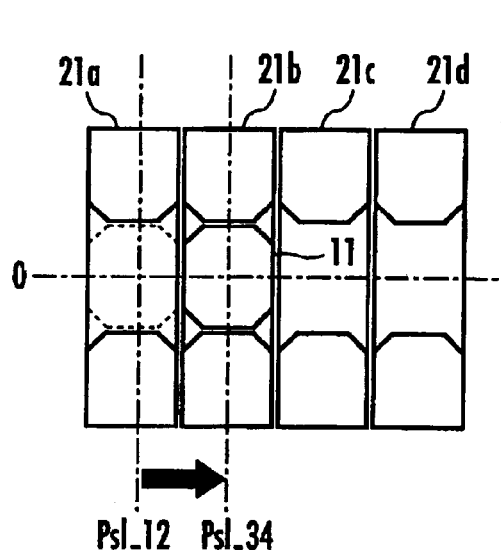
(c) SELECT 3RD GEAR
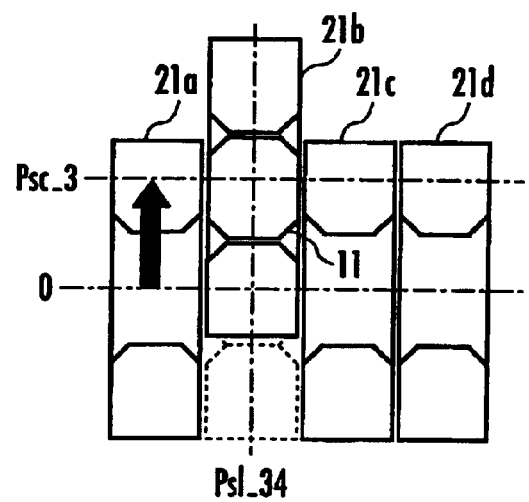
(d) SHIFT TO 3RD GEAR

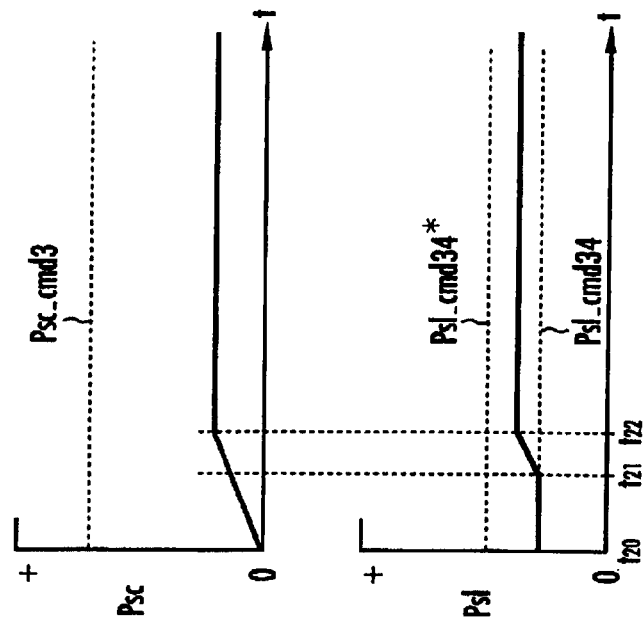
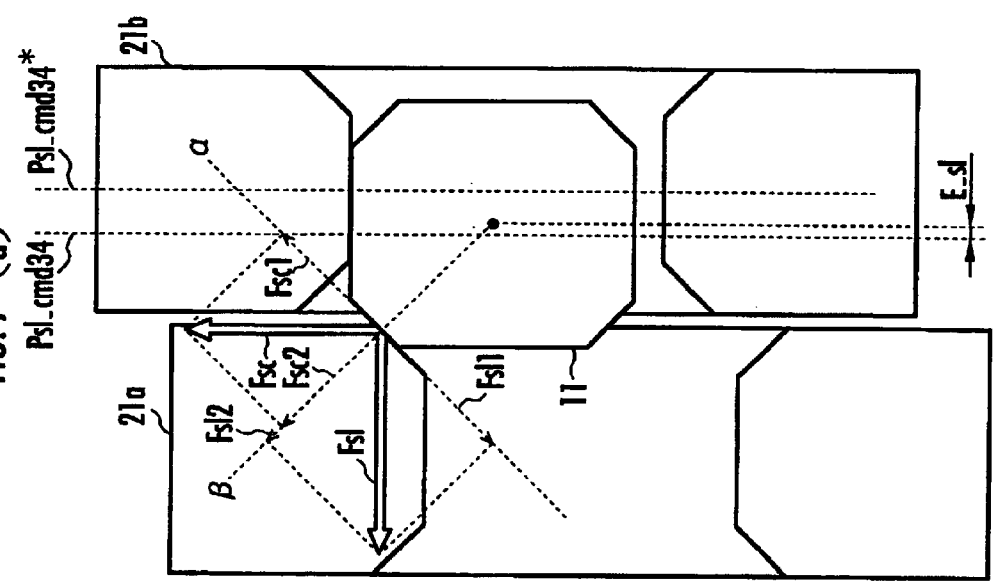
FIG. 7 (a)
FIG. 7 (b)

FIG. 8
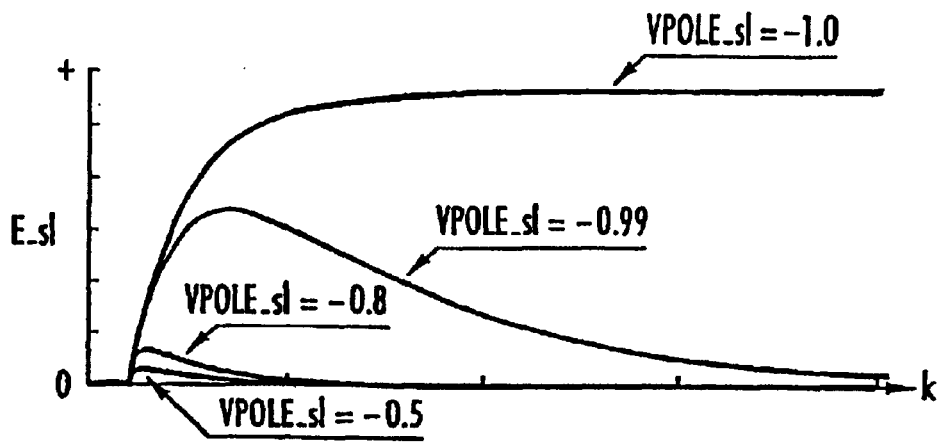
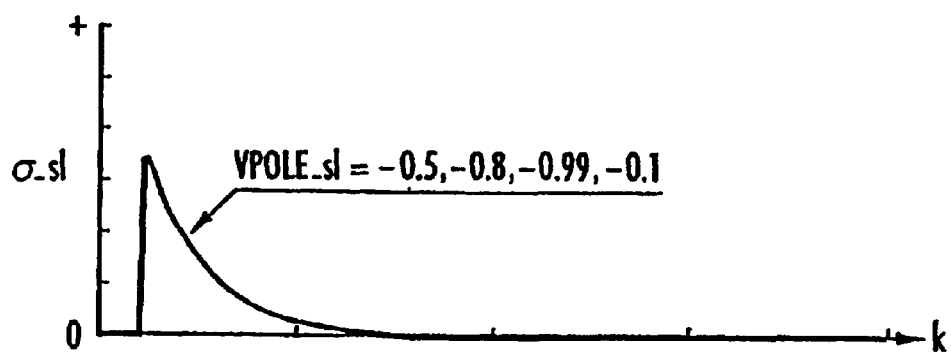
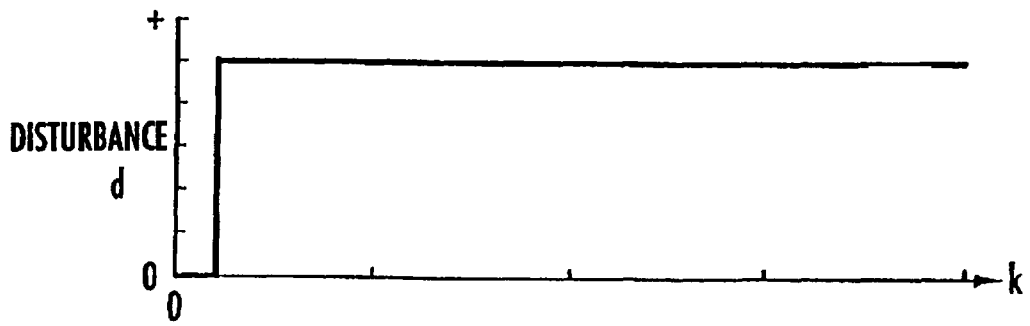

ACTUATOR CONTROL SYSTEM

BACKGROUND OF THE INVENTION

1. Field of the Invention

The present invention relates to an actuator control system adapted to carry out positioning control of an object under control by moving the object in two axial directions by means of an actuator provided for each axis.

2. Description of the Related Art

As a mechanism for moving an object under control by moving it in two axial directions by actuators to position the object, there has been known, for example, an automatic/manual transmission (automatic MT) that includes actuators, such as motors, to replace a manual transmission that performs selecting and shifting operations to transmit motive power between an input shaft and an output shaft of a vehicle by driver's manual selecting or shifting operations.

The present inventors have proposed a control system for performing a shifting operation of an automatic/manual transmission by adopting a response specifying control in the previous application, namely, Japanese Patent Laid-Open Publication No. 2004-211717. In the control system, a coupling sleeve that integrally rotates with an input shaft is moved into contact with a synchronized gear through the intermediary of a synchronizer ring, and the coupling sleeve and the synchronized gear are rotationally synchronized to perform shifting operations.

In this case, the response specifying control is conducted by determining a manipulated variable for driving actuators so as to converge the value of a switching function to zero. The switching function is defined by a linear function based on the difference of a target position and an actual position of a coupling sleeve. A computing coefficient of the linear function is set to lower disturbance suppressing capability level so as to produce a compliance property, which is resiliency of, for example, rubber, thereby damping contact impacts when the coupling sleeve comes into contact with the synchronizer ring.

In the positioning control of a control object in two axial directions, when the control object is to be moved toward a target position on one axis while the control object has been positioned at a target position on the other axis, the movement toward the target position is obstructed if an interfering object exists on the movement path. This prevents the control object from being moved to the target position and also causes overload on the actuators.

SUMMARY OF THE INVENTION

Accordingly, it is an object of the present invention to provide an actuator control system that minimizes the chance of an object under control from being obstructed by an interfering substance that exists on a movement path of the object when the object is moved toward a target position on one axis while the object has been positioned at a target position on the other axis.

The present invention relates to an improvement in an actuator control system including a first actuator for moving an object under control in the direction of a first axis; a first controller for carrying out first positioning control whereby to position the object under control at a target position on the first axis by operating the first actuator, by using response specifying control wherein a behavior for attenuating a difference between a target position and an actual position of the object under control and a speed of the attenuation can be variably specified so as to match the target position and the actual position of the object under control, and by determining a manipulated variable for driving the first actuator so as to converge a value of a switching function, which is specified by a linear function based on at least the aforesaid difference, to zero; a second actuator for moving the object under control in the direction of a second axis that has a predetermined angle with respect to the first axis; and a second controller for carrying out second positioning control whereby to position the object under control at a target position on the second axis by operating the second actuator.

When the object under control is moved to the target position on the second axis by carrying out the second positioning control while the object under control has been positioned at the target position on the first axis by the first positioning control, the first controller sets a computing coefficient of the linear function in the first positioning control such that a disturbance suppressing capability level becomes lower than that when the object under control is moved to the target position on the first axis by the first positioning control while the object under control has been positioned at the target position on the second axis by the second positioning control.

With this arrangement, when the object under control is moved to the target position on the second axis while the object under control has been positioned at the target position on the first axis, the first controller sets a computing coefficient of the linear function in the first positioning control such that a disturbance suppressing capability level becomes lower than that when the object under control is moved to the target position on the first axis while the object under control has been positioned at the target position on the second axis. Thus, a permissible range of the difference between a target position and an actual position of the object under control on the first axis in the first positioning control is expanded by setting the computing coefficient of the linear function in the first positioning control so as to reduce the disturbance suppressing capability level.

In this case, if the object under control comes into contact with an interfering substance while the object under control is being moved to a target position on the second axis by the second positioning control, the object under control can be moved in the direction of the first axis within the expanded permissible range of the difference, permitting easy avoidance of the interfering substance. This makes it possible to restrain the interfering substance from hindering the movement of the object under control toward the target position on the second axis.

The second controller carries out the second positioning control by using response specifying control wherein a behavior for attenuating a difference between a target position and an actual position of the object under control and a speed of the attenuation can be variably specified so as to match the target position and the actual position of the object under control, and by determining a manipulated variable for driving the second actuator so as to converge a value of a switching function, which is specified by a linear function based on at least the aforesaid difference, to zero. When the object under control is moved to a target position on the first axis by the first positioning control while the object under control has been positioned at the target position on the second axis by the second positioning control, the second controller sets a computing coefficient of the linear function in the second positioning control such that a disturbance suppressing capability level becomes lower than that when the object under control is moved to the target position on the second axis by the second positioning control while the object under control has been positioned at the target position on the first axis by the first positioning control.

With this arrangement, the second positioning control is carried out using the response specifying control, and when the object under control is moved to a target position on the first axis with the object under control positioned at the target position on the second axis, the second controller sets a computing coefficient of the linear function in the second positioning control such that a disturbance suppressing capability level becomes lower than that when the object under control is moved to the target position on the second axis with the object under control positioned at the target position on the first axis. Thus, a permissible range of the difference between a target position and an actual position of the object under control on the second axis in the second positioning control is expanded by setting the computing coefficient of the linear function in the second positioning control so as to reduce the disturbance suppressing capability level.

In this case, if the object under control comes into contact with an interfering substance while the object under control is being moved to a target position on the first axis by the first positioning control, the object under control can be moved in the direction of the second axis within the expanded permissible range of the difference, permitting easy avoidance of the interfering substance. This makes it possible to restrain the interfering substance from hindering the movement of the object under control toward the target position on the first axis.

The object under control is a shift arm that is provided in a transmission, actuated for a selecting operation and a shifting operation, and selectively engaged with a shift piece secured to each of shift forks for a plurality of speeds by the selecting operation, and displaces a shift fork associated with the selectively engaged shift piece from a neutral position by the shifting operation so as to establish a predetermined speed. The first axis is the direction of the selecting operation of the shift arm. The first controller positions the shift arm at a selected position of speed by the first positioning control. The second axis is the direction of the shifting operation of the shift arm, and the second controller positions the shift arm at a neutral position and a shift position by the second positioning control.

Components of the transmission have backlashes or individual variations. Hence, when the shift arm is moved from a neutral position to a shift position in a shifting operation by the second positioning control while the shift arm has been positioned in a selected position by the first positioning control and engaged with the shift piece of a shift fork, the shift arm may interfere with a shift piece adjoining the shift piece with which it has been engaged. To avoid such interference, the computing coefficient of the linear function in the first positioning control is set such that the disturbance suppressing capability level is lower than that when the shift arm is moved to a selected position. This allows the shift arm to be moved in the selecting direction by a repulsive force from the interfering shift piece. Thus, the shifting operation can be accomplished, avoiding the interference between the shift arm and the shift piece.

Further, the shift arm may interfere with a shift piece when the shift arm is moved from a selected position to another selected position by the first positioning control in the selecting operation while the shift arm has been positioned at the neutral position to disengage it from the shift piece of a shift fork by the second positioning control. To avoid such interference, the computing coefficient of the linear function in the second positioning control is set such that the disturbance suppressing capability level is lower than that when the shift arm is moved. This allows the shift arm to be moved in the shifting direction by a repulsive force from the interfering shift piece. Thus, the selecting operation can be accomplished, avoiding the interference between the shift arm and the shift piece.

When the shift arm is moved from the neutral position to a shift position by the second positioning control while the shift arm has been positioned at a selected position of speed by the first positioning control, the second controller changes the computing coefficient of the linear function in the second positioning control according to an actual position of the shift arm.

With this arrangement, when the shift arm is moved from the neutral position to a shift position by the second positioning control, the computing coefficient of the linear function in the second positioning control is changed to as to change the compliance property of the shift arm in the process of shifting. This makes it possible to alleviate shocks that occur during the shifting operation.

BRIEF DESCRIPTION OF THE DRAWINGS

FIGS. 3A, 3B, 3C and 3D are operation explanatory diagrams of the transmission shown in FIG. 1;

FIGS. 7A and 7B are explanatory diagrams of a shifting operation in an automatic/manual transmission;

FIG. 8 shows graphs illustrating changes in a disturbance suppressing capability level when a response specifying parameter is changed;

DESCRIPTION OF THE PREFERRED EMBODIMENTS

Figure 1:
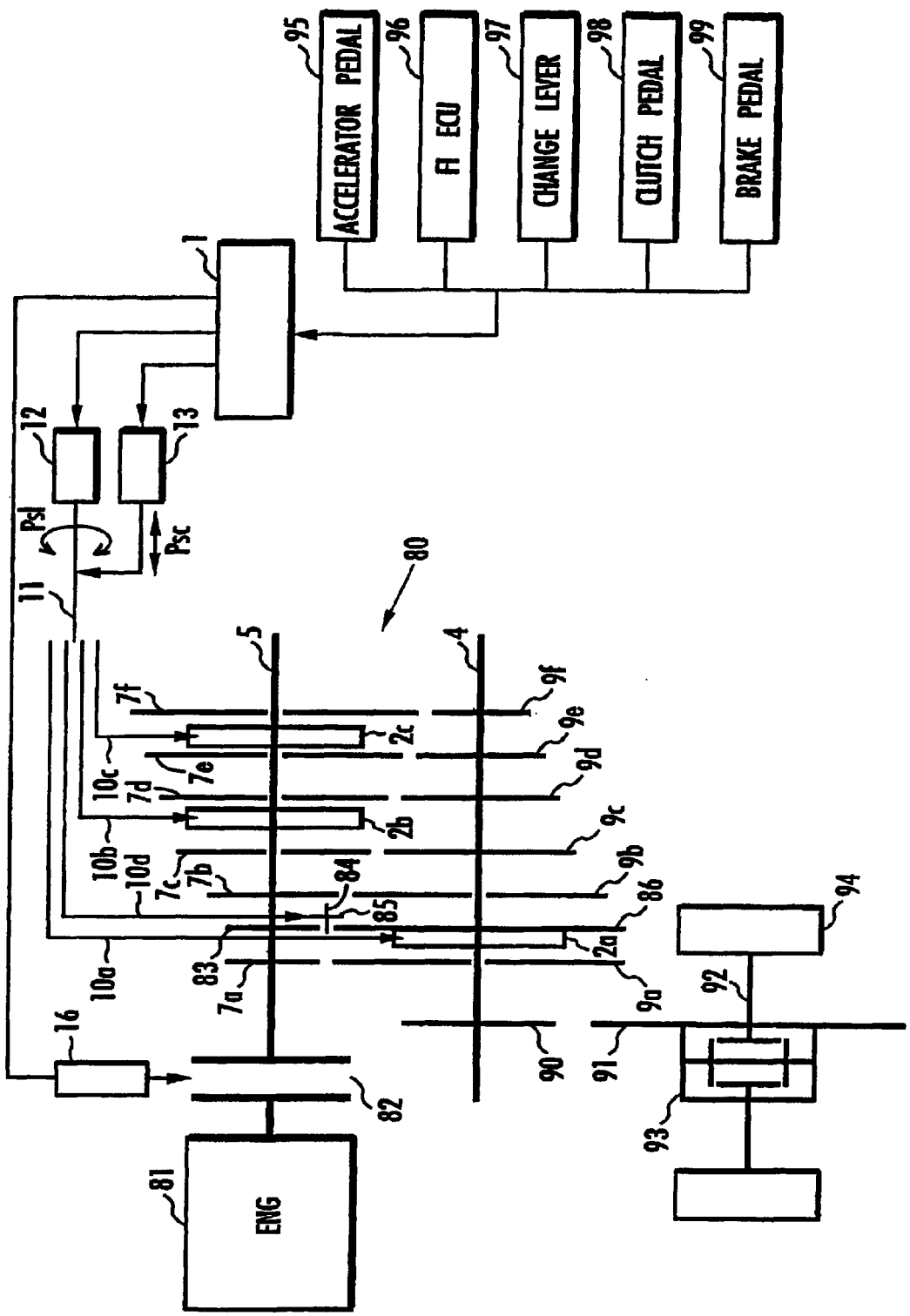
FIG. 1 is a block diagram of a transmission.
Figure 2:
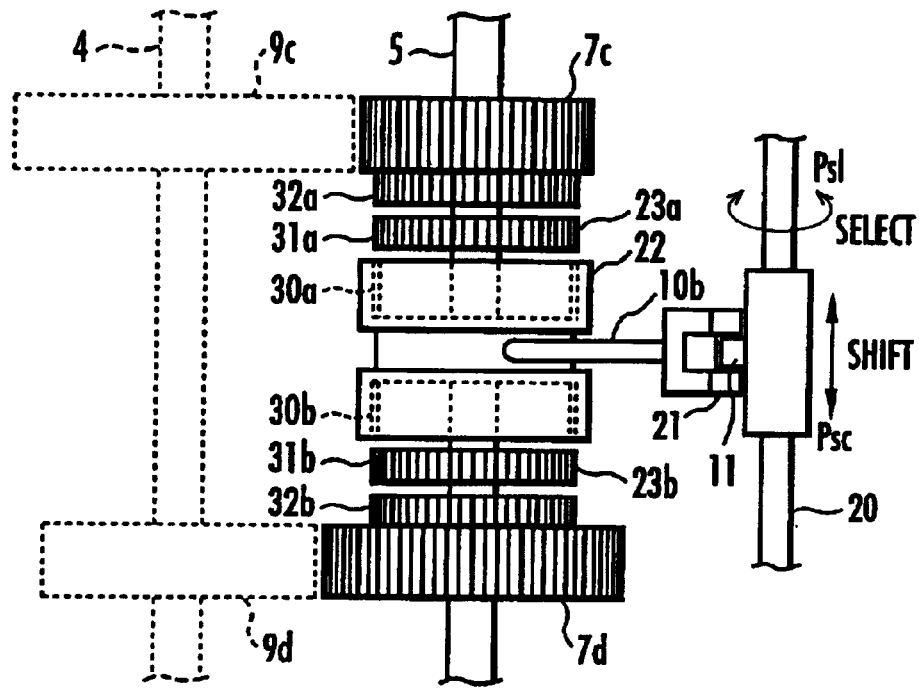
FIGS. 2A and 2B are detailed diagrams of a shift/select mechanism of the transmission shown in FIG. 1.
Figure 2:
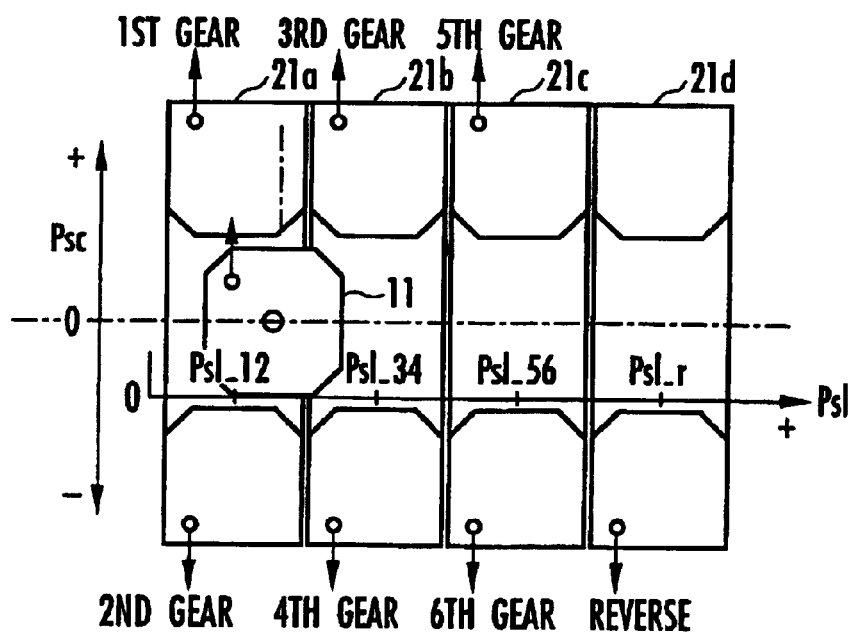
Figure 4:
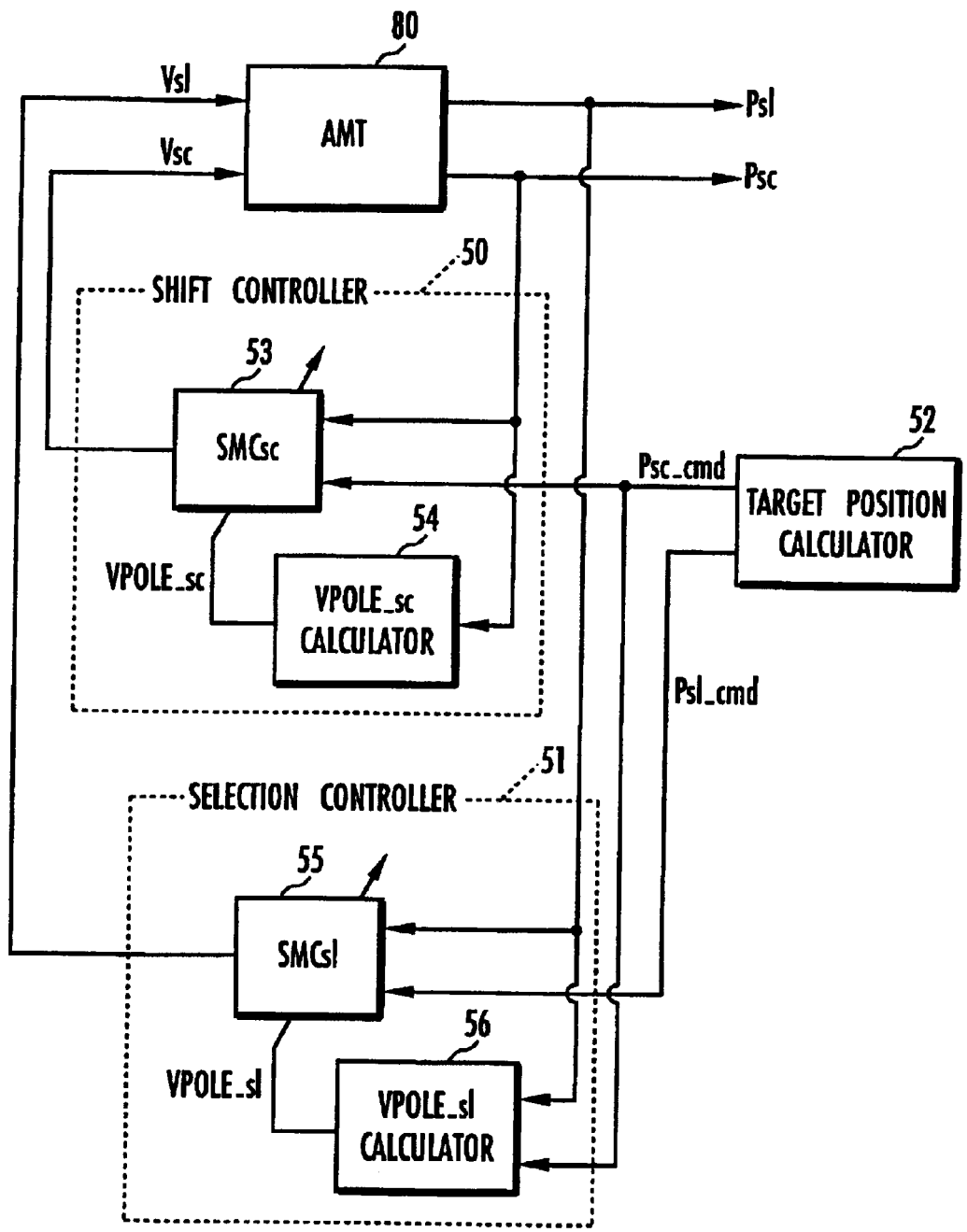
FIG. 4 is a block diagram of a controller shown in FIG. 1.
Figure 5:
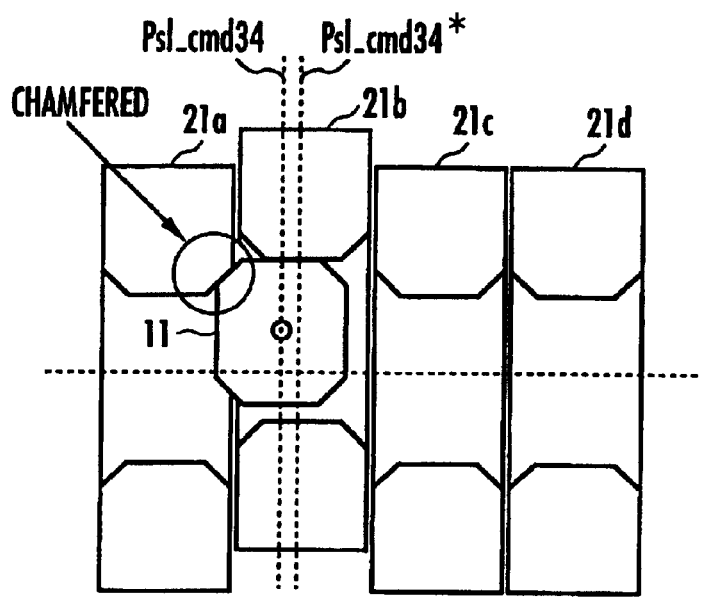
FIGS. 5A and 5B are explanatory diagrams of a shifting operation.
Figure 5:
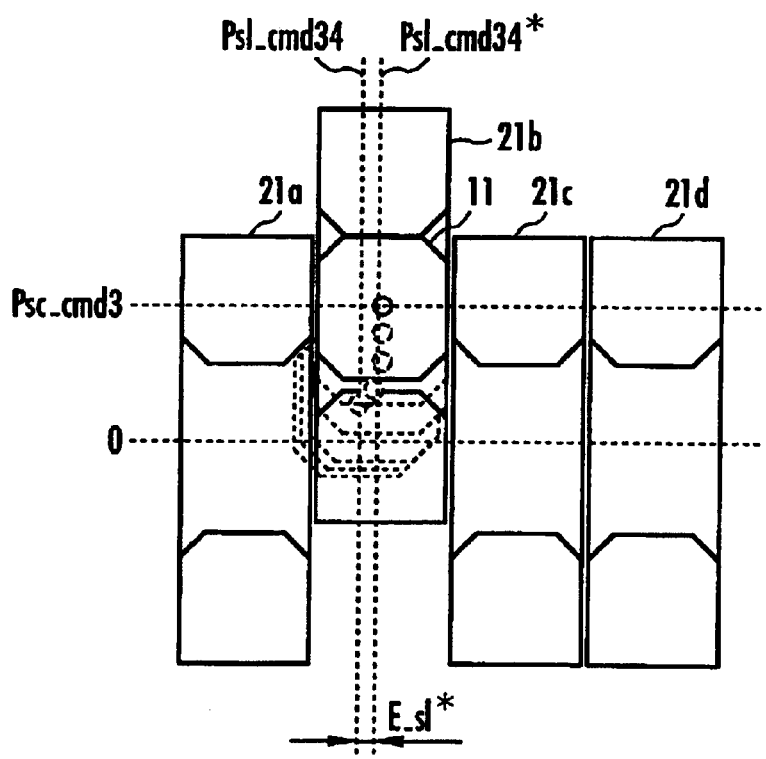
Figure 6:
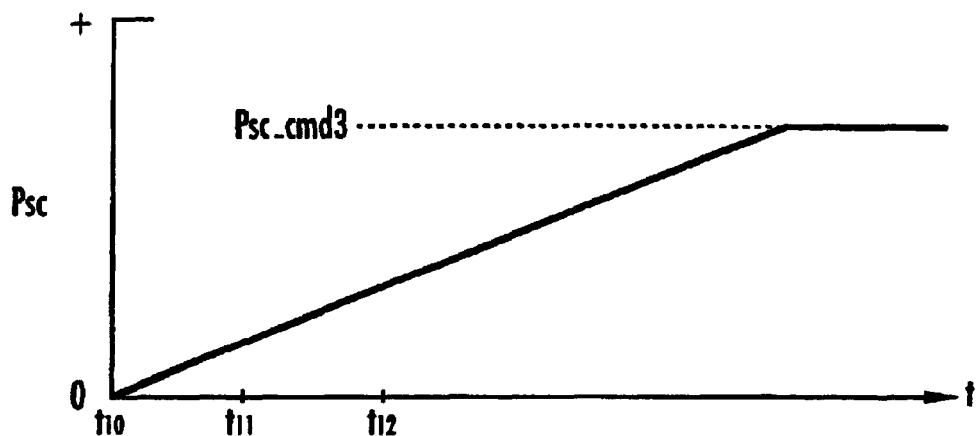
FIGS. 6A and 6B are graphs showing displacements of a shift arm in a shifting operation in a manual transmission.
Figure 6:
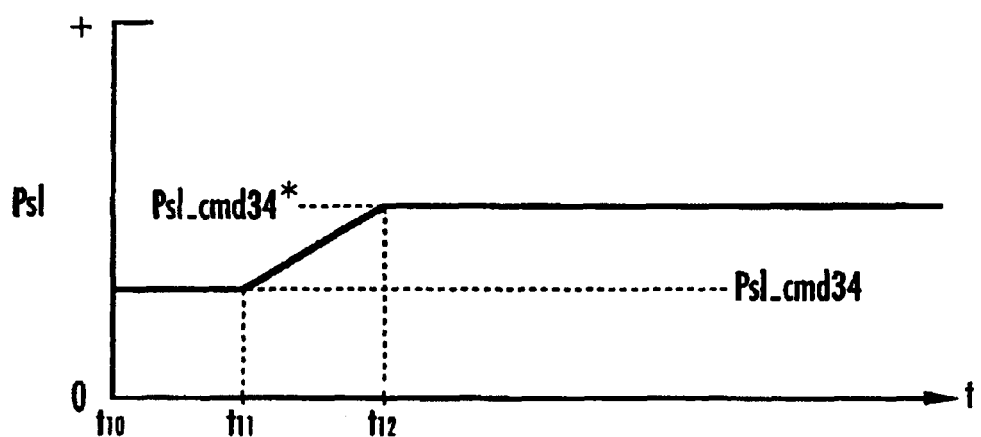
Figure 9:
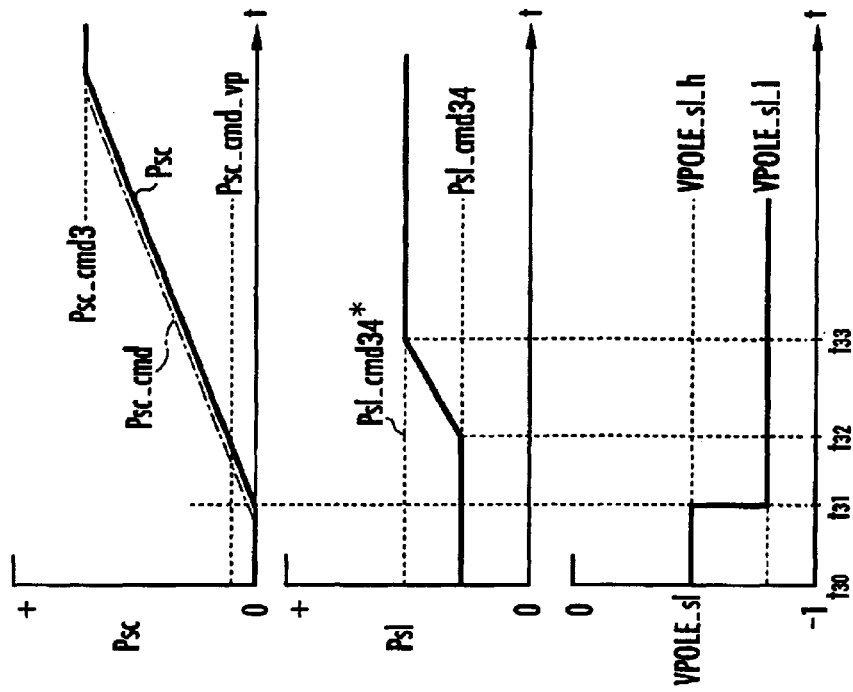
FIGS. 9A and 9B are explanatory diagrams of shifting operations when a response specifying parameter is changed in the automatic/manual transmission.
Figure 9:
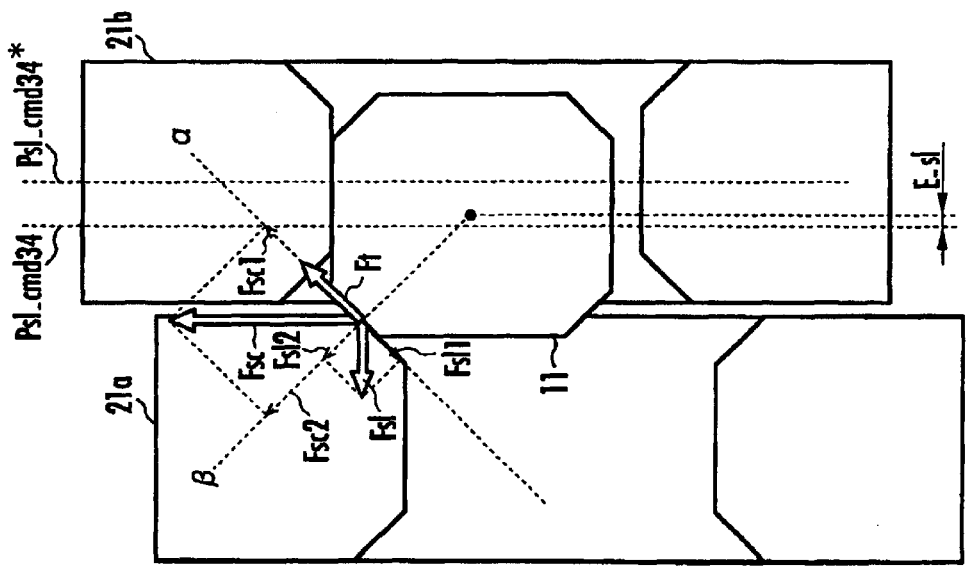
Figure 10:
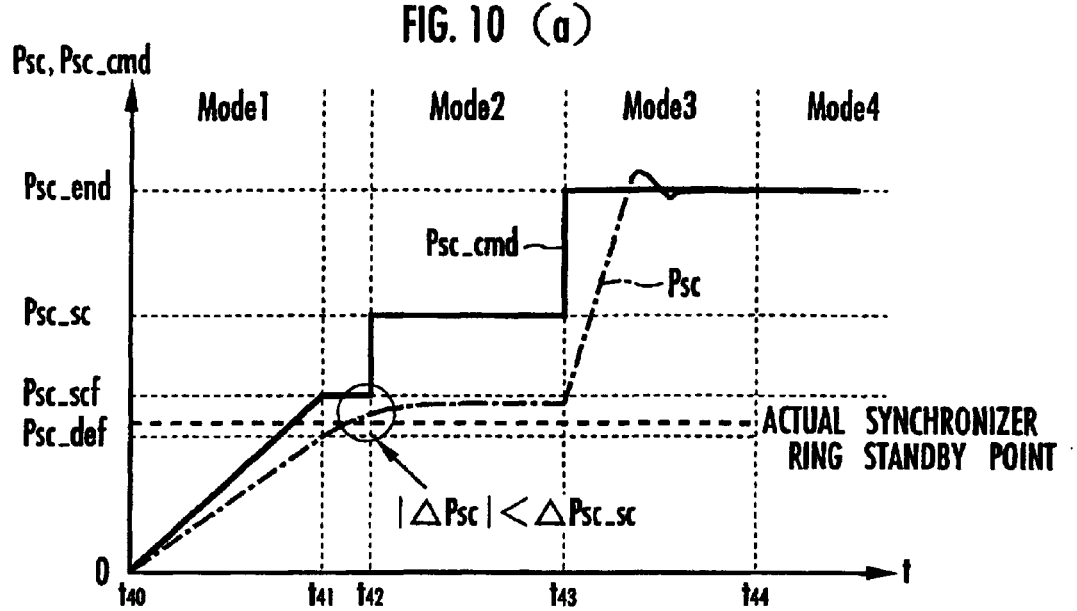
FIGS. 10A and 10B are graphs showing displacements of the shift arm in relation to response specifying parameter settings in a shifting operation.
Figure 10:
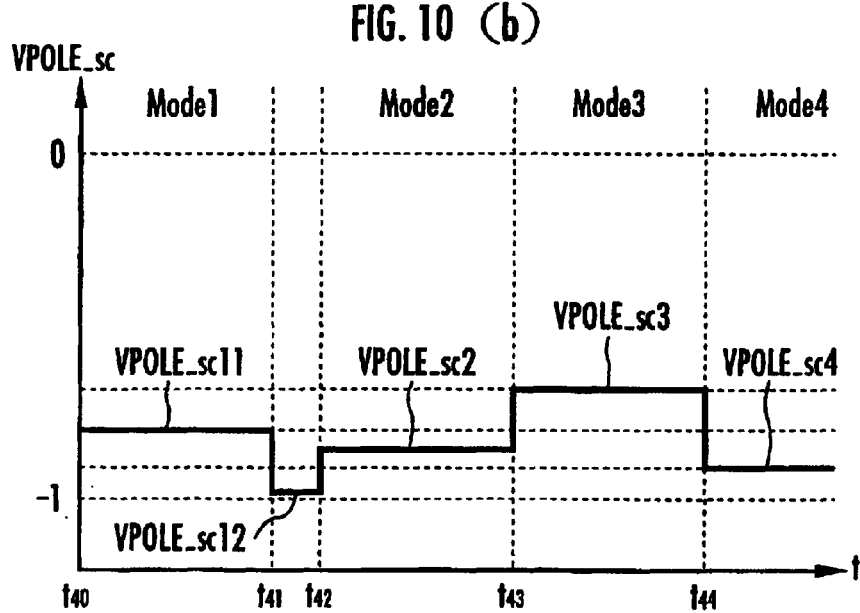
Figure 11:
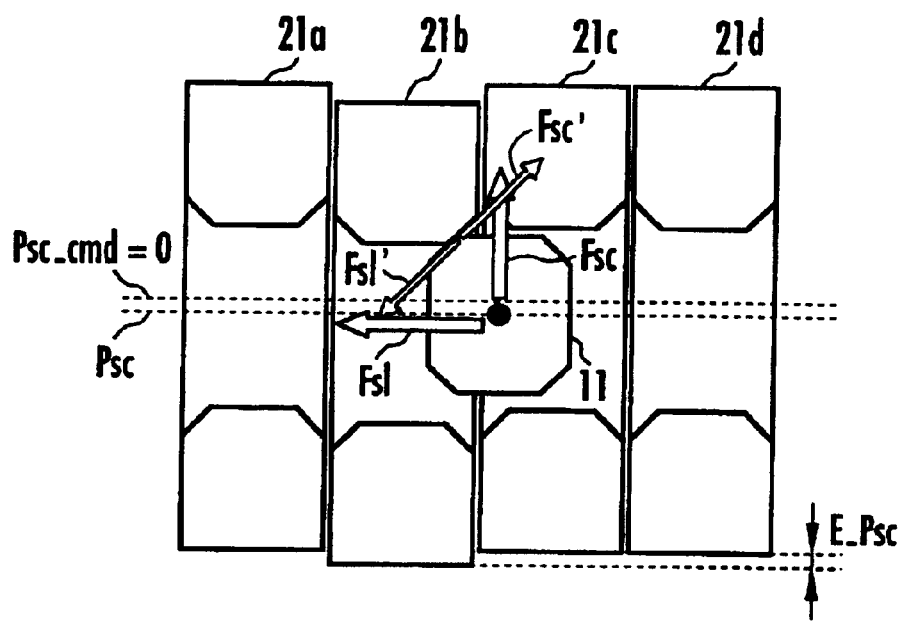
FIGS. 11A and 11B are explanatory diagrams of a selecting operation in the automatic/manual transmission.
Figure 11:
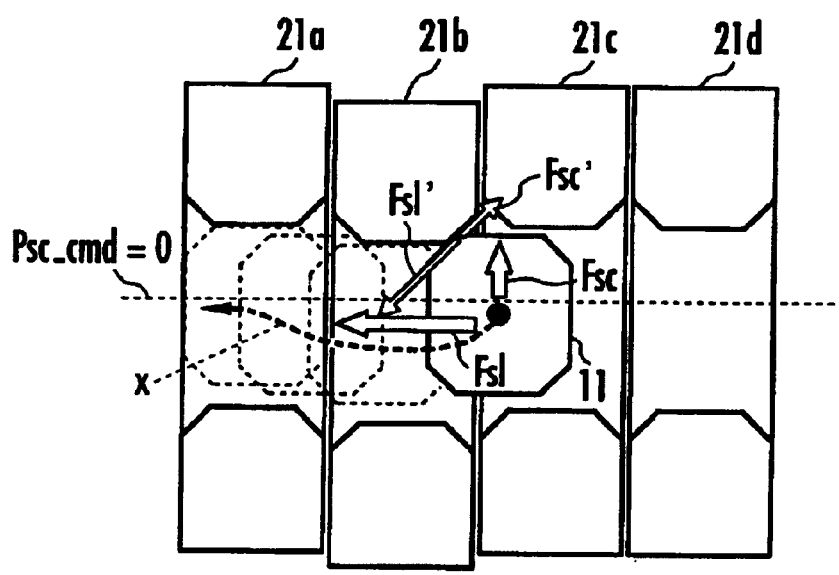

An embodiment in accordance with the present invention will be described with reference to FIG. 1 through FIG. 21. FIG. 1 is a block diagram of a transmission; FIGS. 2A and 2B are detailed diagrams of a shift/select mechanism of the transmission; FIGS. 3A, 3B, 3C and 3D are operation explanatory diagrams of the transmission; FIG. 4 is a block diagram of a controller shown in FIG. 1; FIGS. 5A and 5B are explanatory diagrams of a shifting operation; FIGS. 6A and 6B are graphs showing displacements of a shift arm in a shifting operation in a manual transmission; FIGS. 7A and 7B are explanatory diagrams of a shifting operation in an automatic/manual transmission; FIG. 8 presents graphs illustrating changes in a disturbance suppressing capability level when a response specifying parameter is changed; FIGS. 9A and 9B are explanatory diagrams of shifting operations when a response specifying parameter is changed in the automatic/manual transmission; FIGS. 10A and 10B are graphs showing displacements of the shift arm in relation to response specifying parameter settings in a shifting operation; and FIGS. 11A and 11B are explanatory diagrams of a selecting operation in the automatic/manual transmission.

Figure 12:
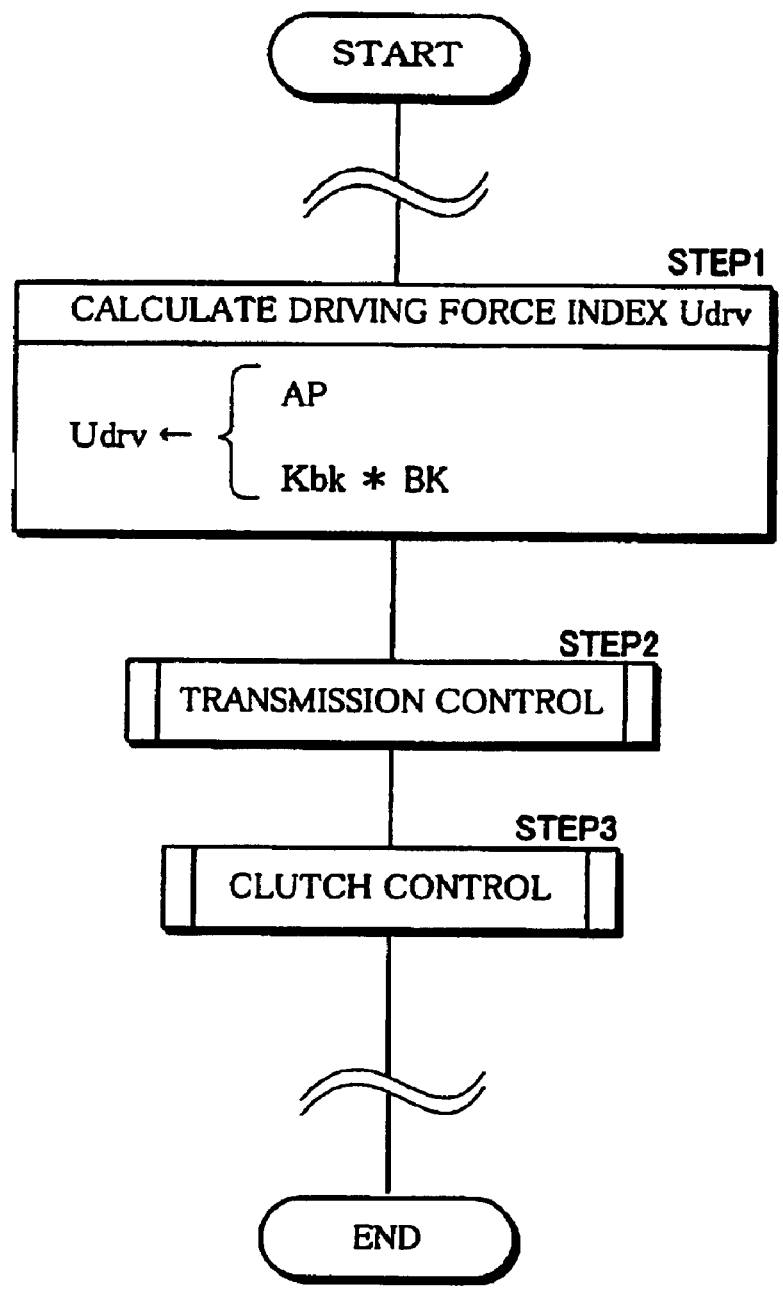
FIG. 12 shows a main flowchart of the controller shown in FIG. 1.
Figure 13:
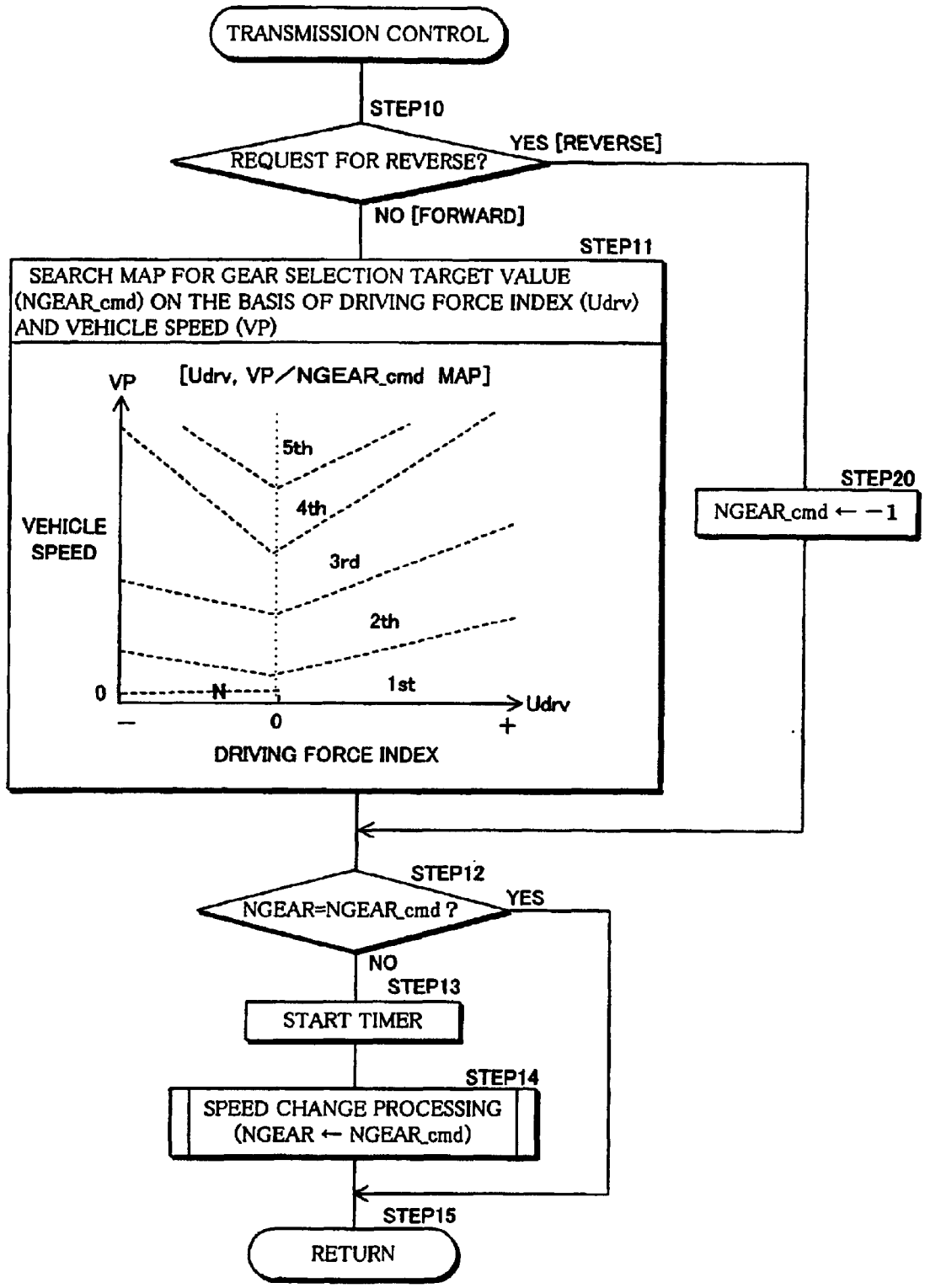
FIG. 13 shows a flowchart of the control of a transmission.
Figure 14:
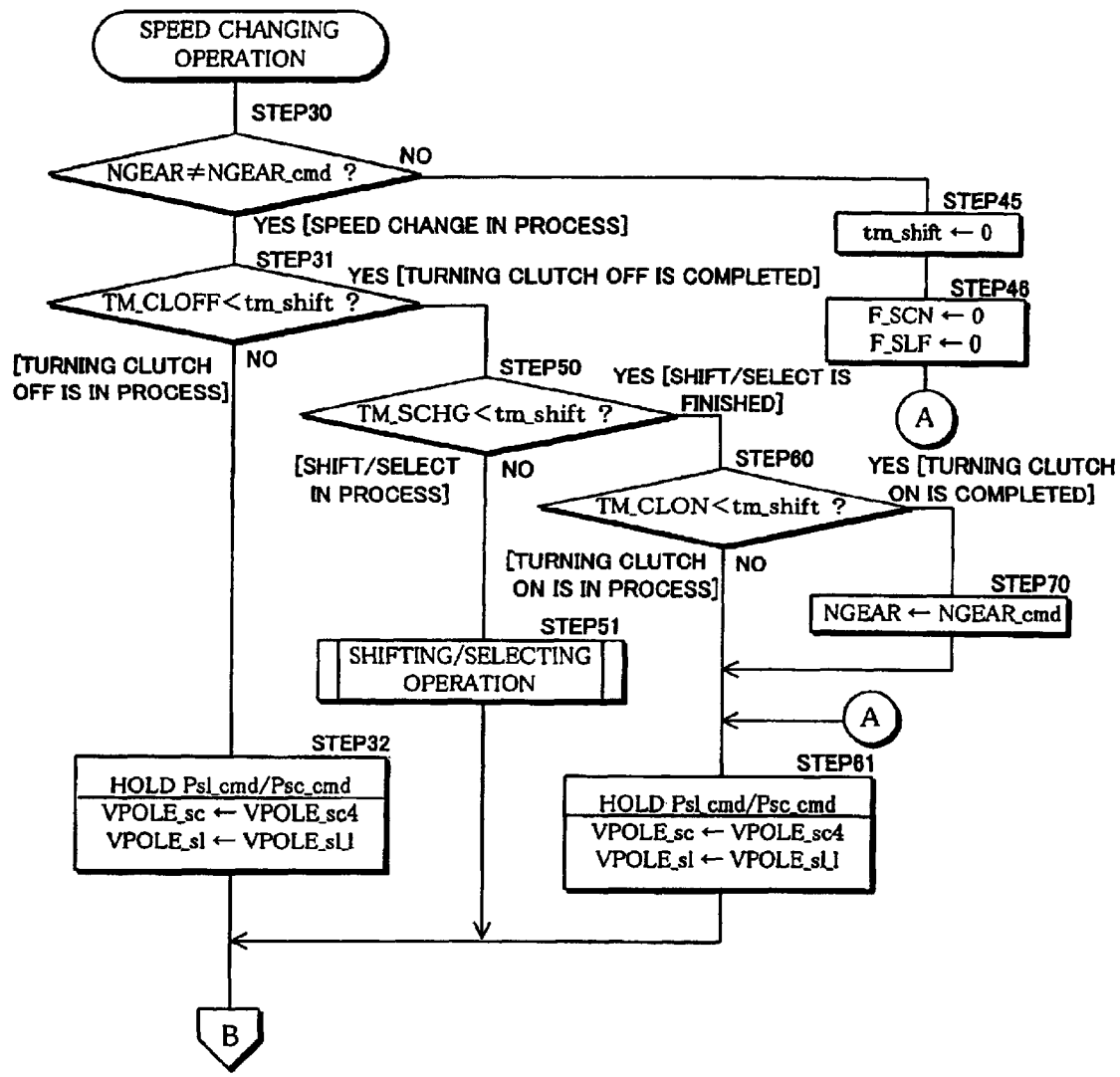
FIG. 14 shows a flowchart of a speed changing operation.
Figure 15:
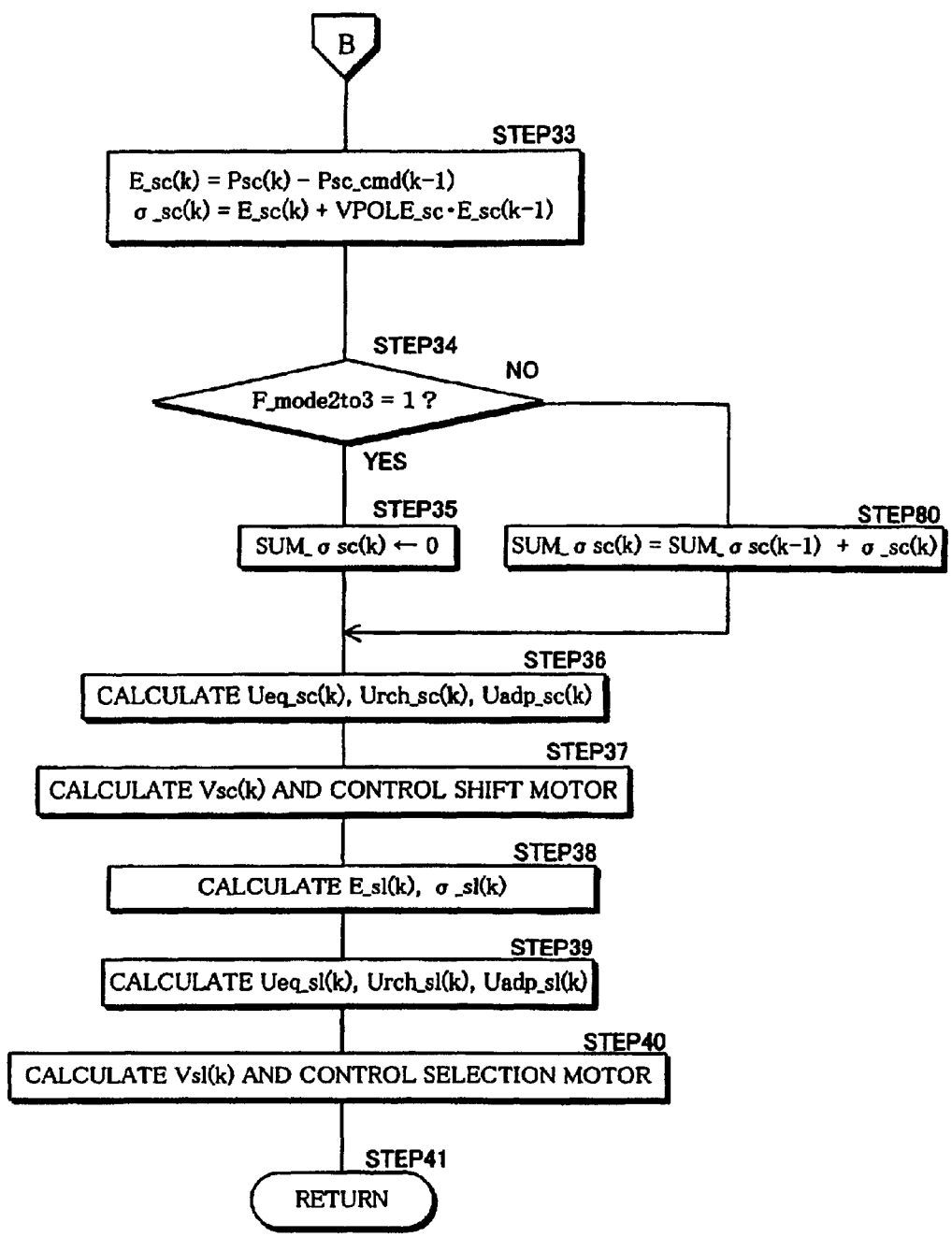
FIG. 15 shows another flowchart of the speed changing operation.
Figure 16:
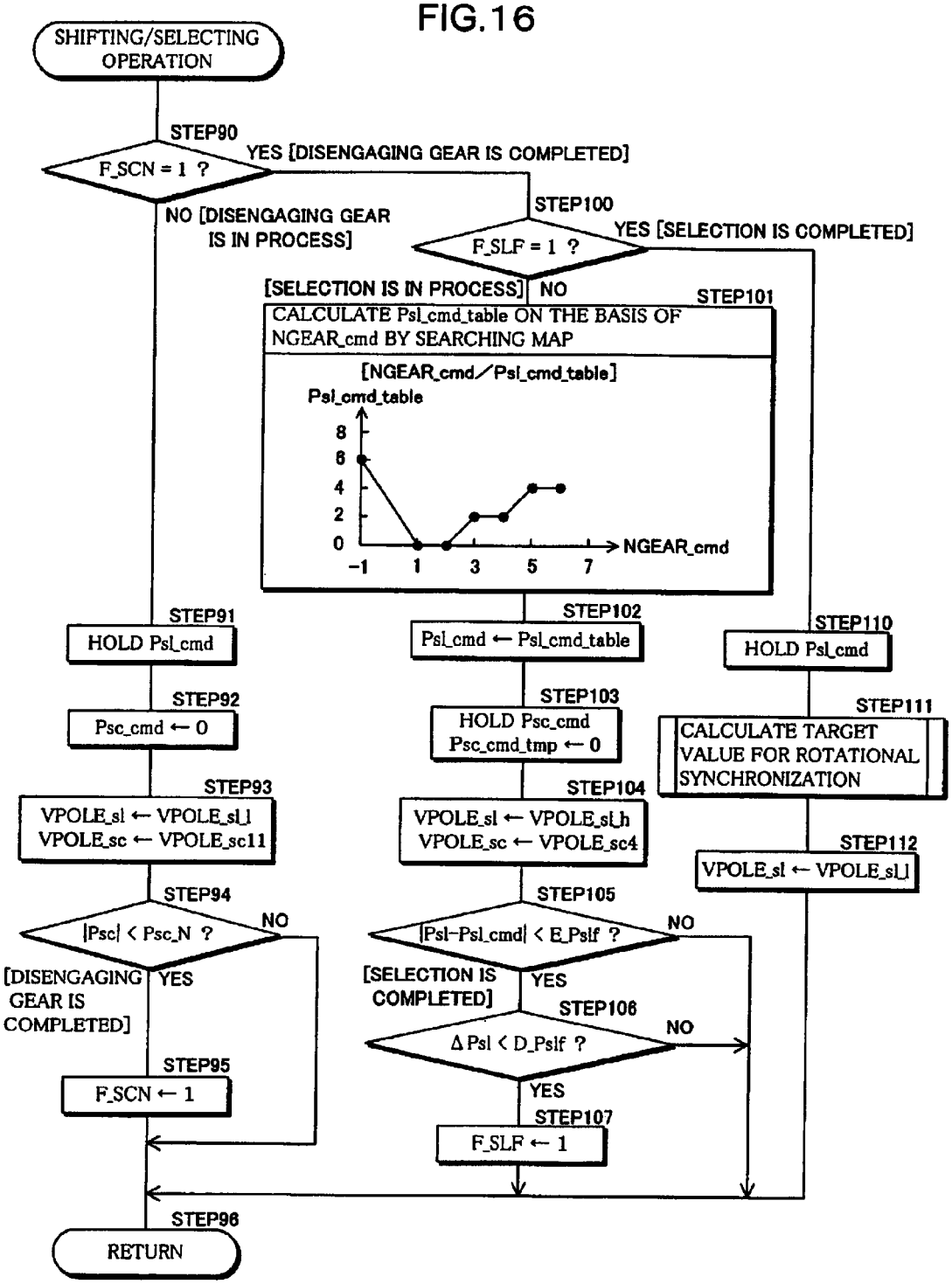
FIG. 16 shows a flowchart of a shifting/selecting operation.
Figure 17:
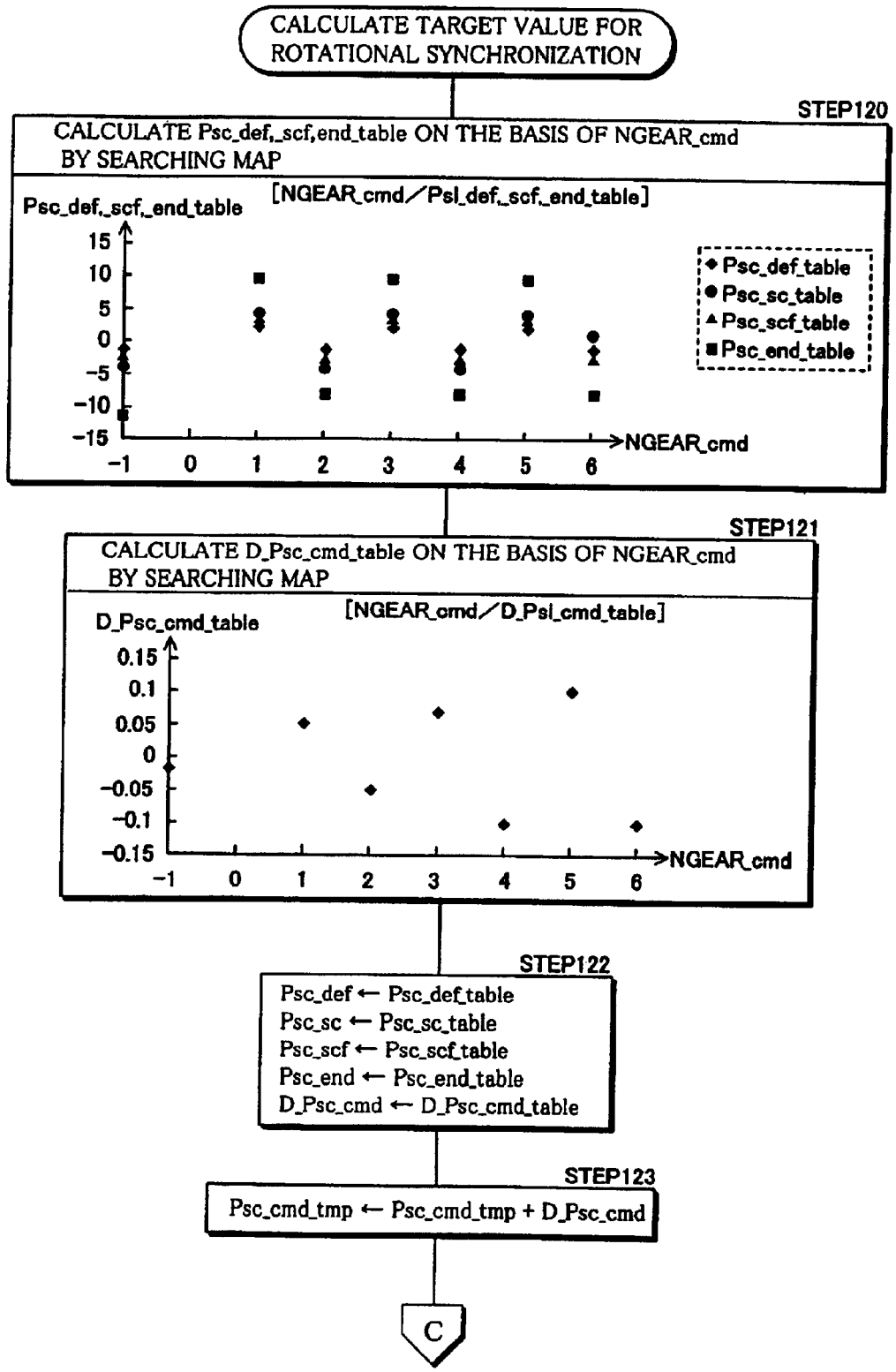
FIG. 17 shows a flowchart of an operation for calculating a target value for rotational synchronization.
Figure 18:
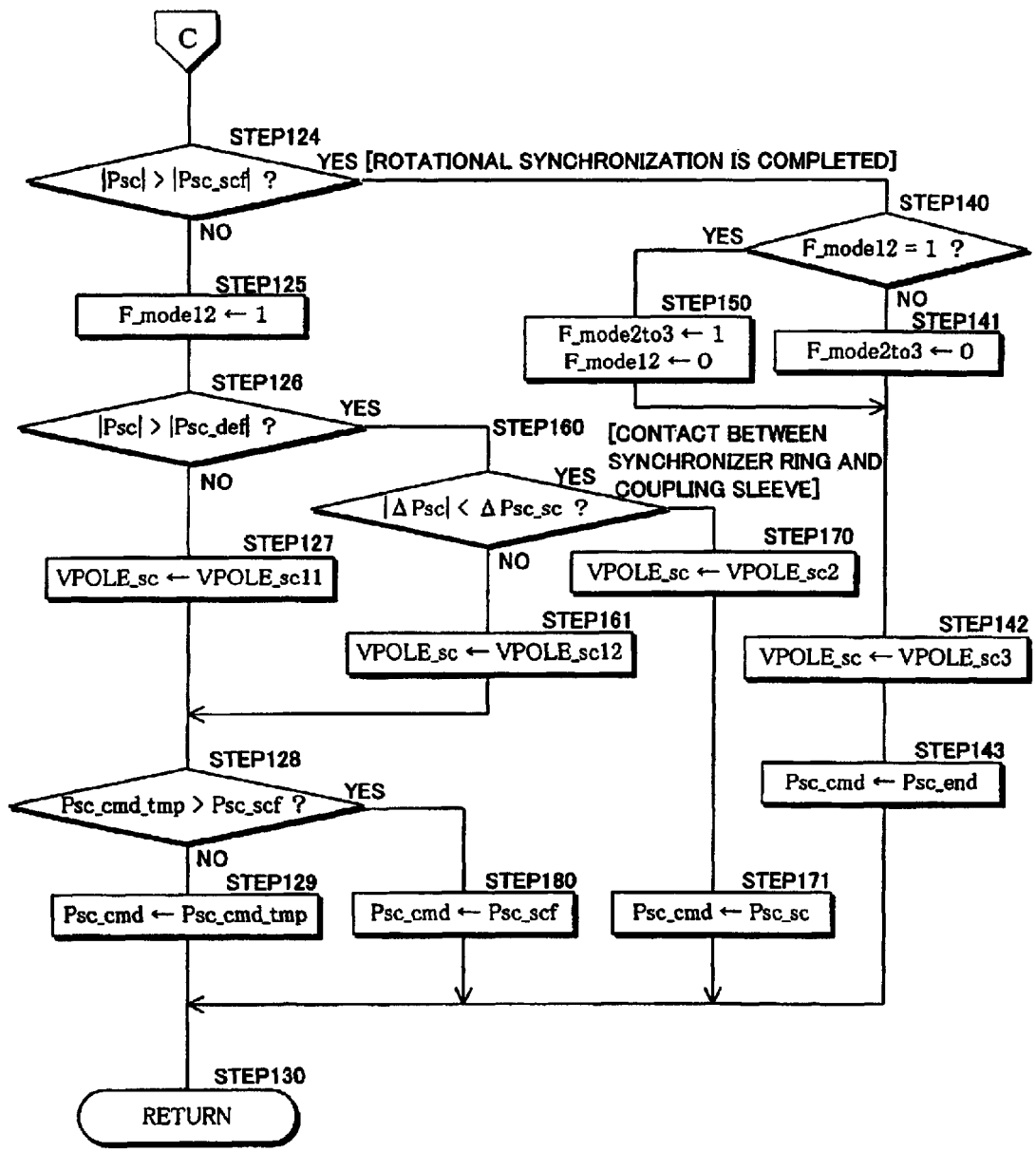
FIG. 18 shows another flowchart of the operation for calculating the target value for the rotational synchronization.
Figure 19:
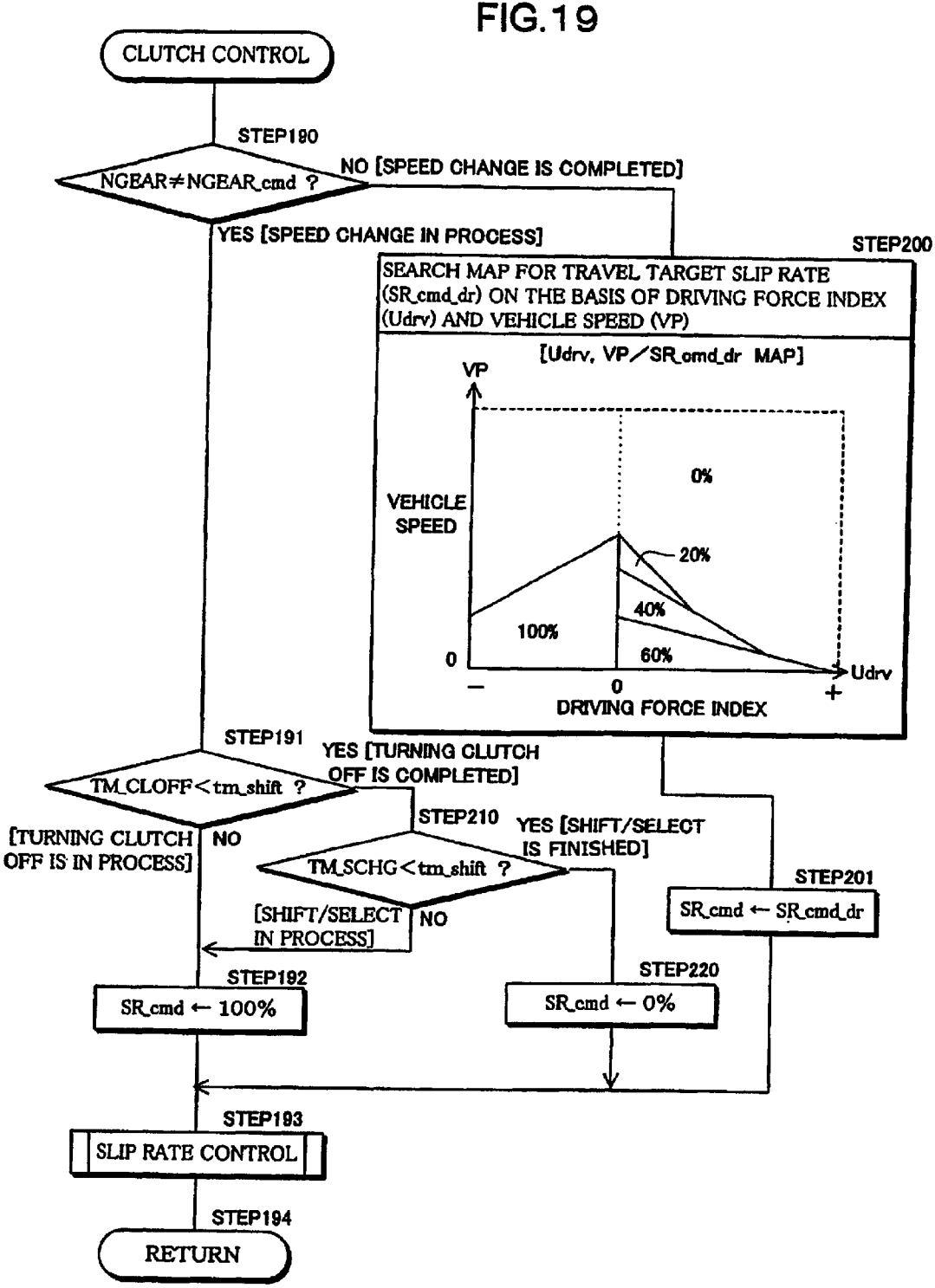
FIG. 19 shows a flowchart of clutch control.
Figure 20:
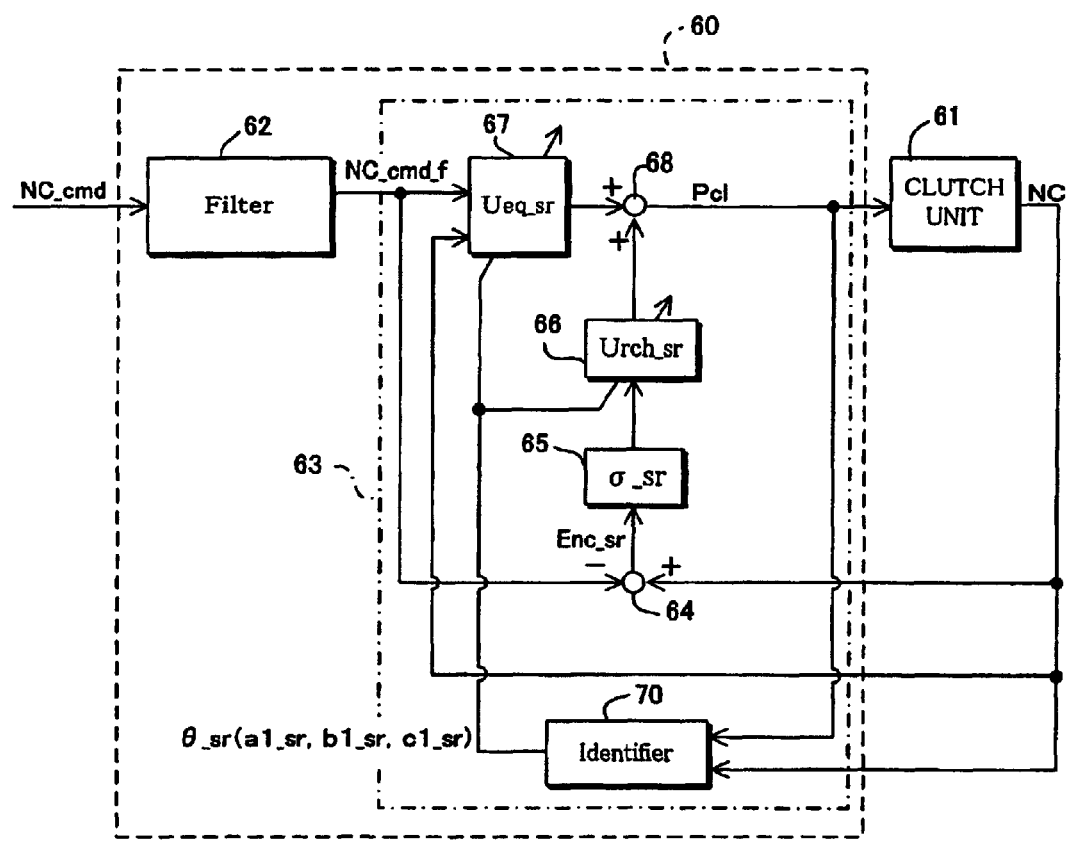
FIG. 20 is a block diagram of a clutch slip rate controller.
Figure 21:
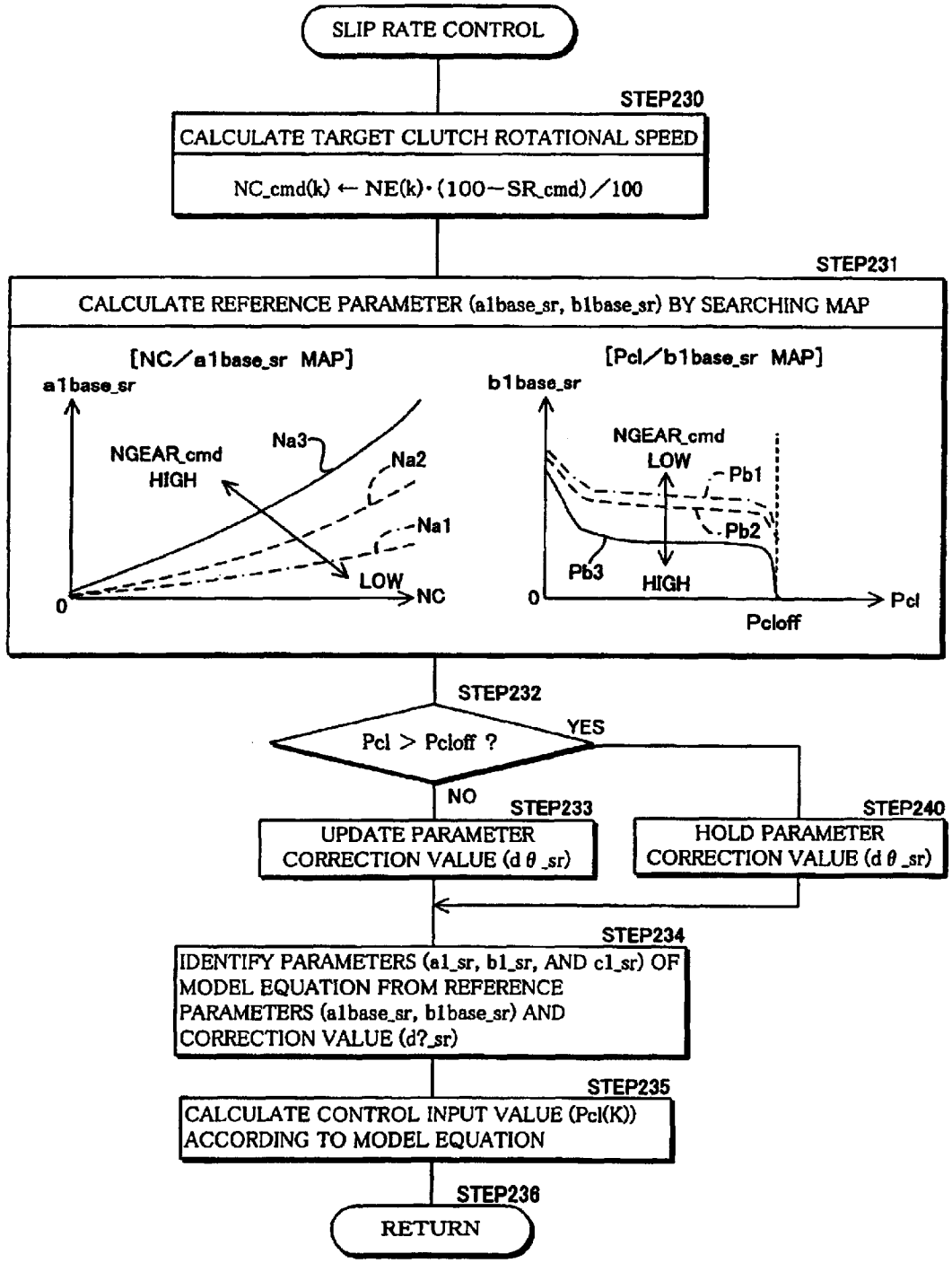
FIG. 21 is a flowchart of slip rate control.

FIG. 12 shows a main flowchart of a controller; FIG. 13 shows a flowchart of the control of a transmission; FIG. 14 and FIG. 15 show flowcharts of a speed changing operation; FIG. 16 shows a flowchart of a shifting/selecting operation; FIG. 17 and FIG. 18 show flowcharts of an operation for calculating a target value for rotational synchronization; FIG. 19 shows a flowchart of clutch control; FIG. 20 is a block diagram of a clutch slip rate controller; and FIG. 21 is a flowchart of slip rate control.

Referring to FIG. 1, a transmission 80 is mounted in a vehicle to transmit outputs of an engine 81 through the intermediary of a clutch assembly 82 and a connecting gear 90. The connecting gear 90 meshes with a gear 91 of a differential 93, thereby causing outputs of the engine 81 to be transmitted to drive wheels 94 through the intermediary of a drive shaft 92.

The operation of the transmission 80 is controlled by a control unit 1, which is an electronic unit composed of a microcomputer and memories, etc. The control unit 1 includes functions of the control unit of actuators according to the present invention. The control unit 1 drives a selection motor 12 (corresponding to a first actuator in the present invention), a shift motor 13 (corresponding to a second actuator in the present invention), and a clutch actuator 16 according to the states of an accelerator pedal 95, a fuel supply control unit 96, a change lever 97, a clutch pedal 98, and a brake pedal 99 so as to control the speed changing operation of the transmission 80.

The transmission 80 has an input shaft 5, an output shaft 4, pairs of first through sixth forward gears 7a through 7f and 9a through 9f, and a reverse gear shaft 84 and reverse gear trains 83, 85 and 86. The input shaft 5, the output shaft 4, and the reverse gear shaft 84 are disposed to be parallel to each other.

The pairs of first to sixth forward gears 7a through 7f and 9a through 9f are set to different gear ratios from each other. The first forward gear 7a on an input side and the second forward gear 7b on the input side are provided integrally with the input shaft 5. The corresponding first forward gear 9a on an output side and a second forward gear 9b on the output side are composed of idle gears that are rotative with respect to the output shaft 4. A first/second gear synchronizer 2a switches between two modes, namely, a mode in which the first forward gear 9a on the output side and the second forward gear 9b on the output side are selectively connected to the output shaft 4 (speed change established mode) and a mode in which both gears 9a and 9b are disengaged from the output shaft 4 (neutral mode).

A third forward gear 7c on the input side and a fourth forward gear 7d on the input side are composed of idle gears rotative with respect to the input shaft 5. The corresponding third forward gear 9c on an output side and a fourth forward gear 9d on the output side are formed integrally with the output shaft 4. A third/fourth gear synchronizer 2b switches between two modes, namely, a mode in which the third forward gear 7c on the input side and the fourth forward gear 7d on the input side are selectively connected to the input shaft 5 (speed change established mode) and a mode in which both gears 7c and 7d are disengaged from the input shaft 5 (neutral mode).

Similarly, a fifth forward gear 7e on the input side and a sixth forward gear 7f on the input side are composed of idle gears rotative with respect to the input shaft 5. The corresponding fifth forward gear 9e on the output side and a sixth forward gear 7f on the output side are formed integrally with the output shaft 4. A fifth/sixth gear synchronizer 2c switches between two modes, namely, a mode in which the fifth forward gear 7e on the input side and the sixth forward gear 7f on the input side are selectively connected to the input shaft 5 (speed change established mode) and a mode in which both gears 7e and 7f are disengaged from the input shaft 5 (neutral mode).

The reverse gear trains 83, 85 and 86 are formed of a first reverse gear 85 mounted on a reverse gear shaft 84, a second reverse gear 83 provided integrally with the input shaft 5, and a third reverse gear 86 formed integrally with the first/second gear synchronizer 2a of the output shaft 4. The first reverse gear 85 is attached to the reverse gear shaft 84 by spline fitting. This causes the first reverse gear 85 to rotate integrally with the reverse gear shaft 84 and also to be free to slide in the axial direction of the reverse gear shaft 84 between a position where it meshes with both the second reverse gear 83 and the third reverse gear 86 and a position where its engagement with those gears is cleared (neutral position).

Furthermore, shift forks 10a, 10b, 10c, and 10d are connected to the synchronizers 2a, 2b, and 2c and the first reverse gear 85, respectively, and a shift piece (see FIG. 2) provided on a distal end of each shift fork is selectively engaged with a shift arm 11. The shift arm 11 is rotated by the selection motor 12, and the shift forks are provided substantially linearly in parallel in an arcuate direction (a selecting direction corresponding to a first axial direction in the present invention) in which the shift arm 11 turns. The shift arm 11 is selectively positioned at positions where it engages with any one of the shift pieces.

The shift arm 11 is moved in an axial direction parallel to the input shaft 5 (a shifting direction corresponding to a second axial direction in the present invention) by the shift motor 13, with the shift arm 11 in engagement with any one of the shift pieces. The shift arm 11 is positioned at the neutral position and a shift position where each speed is established.

FIG. 2A shows a construction of the synchronizer 2b shown in FIG. 1. The synchronizer 2c has the same construction as that of the synchronizer 2b. The synchronizer 2a is the same as the synchronizers 2b and 2c in basic construction and operations except that it is mounted on the output shaft 4.

The synchronizer 2b has a coupling sleeve 22 integrally rotates with the input shaft 5, a synchronizer ring 23a provided rotatively on the input shaft 5 between the coupling sleeve 22 and the third forward gear 7c on the input side and also movably in the axial direction of the input shaft 5, a synchronizer ring 23b provided rotatively on the input shaft 5 between the coupling sleeve 22 and the fourth forward gear 7d on the input side and also movably in the axial direction of the input shaft 5, and a shift fork 10b connected to the coupling sleeve 22.

A shift piece 21 fixed on a distal end of the shift fork 10b engages the shift arm 11 fixed to a shift/select shaft 20. The shift/select shaft 20 rotates as the selection motor 12 is actuated to perform the selecting operation, and it moves in the axial direction as the shift motor 13 is actuated to perform the shifting operation. Performing the shifting operation with the shift arm 11 engaged with the shift piece 21 by the selecting operation causes the coupling sleeve 22 to be displaced from the neutral position toward the third forward gear 7c on the input side when the third gear is selected or toward the fourth forward gear 7d on the input side when the fourth gear is selected.

Both ends of the coupling sleeve 22 are hollow, splines 30a and 30b being formed on the inner peripheral surfaces of the hollow portions. The outer peripheral surface of the synchronizer ring 23a has a spline 31a engageable with a spline 30a of the coupling sleeve 22. The outer peripheral surface of the third forward gear 7c on the input side that opposes the synchronizer ring 23a also has a spline 32a engageable with the spline 30a of the coupling sleeve 22.

Similarly, the outer peripheral surface of the synchronizer ring 23b has a spline 31b engageable with the spline 30b of the coupling sleeve 22. The outer peripheral surface of the fourth forward gear 7d on the input side that opposes the synchronizer ring 23b also has a spline 32b engageable with the spline 30b of the coupling sleeve 22.

When the coupling sleeve 22, which has rotated together with the input shaft 5, is moved toward the third forward gear 7c on the input side by the shift fork 10b, the coupling sleeve 22 comes in contact with the synchronizer ring 23a, and then the synchronizer ring 23a is also brought into contact with the third forward gear 7c on the input side. At this time, the frictional force produced by the contact synchronizes the rotational speeds of the coupling sleeve 22 and the third forward gear 7c on the input side through the intermediary of the synchronizer ring 23a.

With the rotational speeds of the coupling sleeve 22 and the third forward gear 7c on the input side synchronized, the coupling sleeve 22 is further moved toward the third forward gear 7c on the input side causes the spline 30a formed on the coupling sleeve 22 to pass by the spline 31a formed on the synchronizer ring 23a and to engage the spline 32a formed on the third forward gear 7c on the input side. This sets an established speed change state in which motive power is transmitted between the input shaft 5 and the output shaft 4.

Similarly, moving the coupling sleeve 22, which has rotated together with the input shaft 5, toward the fourth forward gear 7d on the input side by the shift fork 10b synchronizes the rotational speeds of the coupling sleeve 22 and the fourth forward gear 7d on the input side through the intermediary of the synchronizer ring 23b. Then, the spline 30b formed on the coupling sleeve 22 passes by the spline 31b formed on the synchronizer ring 23b and engages the spline 32b formed on the fourth forward gear 7d on the input side.

FIG. 2B shows linearly disposed shift pieces 21a, 21b, 21c and 21d observed from the shift arm 11. In the selecting operation, the shift arm 11 is moved in a direction Psl, which is the selecting direction, shown in FIG. 2B, positioned at a 1st/2nd gear select position Psl__12, a 3rd/4th gear select position Psl__34, a 5th/6th gear select position Psl__56, or a reverse select position Psl__r, and then engaged with the shift piece 21a, 21b, 21c or 21d. In the shifting operation, the shift arm 11 is moved in a direction Psc, which is the shift direction, to establish a new speed (the first to sixth speed or reverse).

FIGS. 3A through 3D illustrate the operation of the shift arm 11 when a state wherein the second speed has been established is replaced by the third speed. Positioning of the shift arm 11 is carried out in the order of FIG. 3A, FIG. 3B, FIG. 3C, and FIG. 3D. FIG. 3A illustrates a state wherein the second speed has been established, the shift arm 11 being engaged with the shift piece 21a. The position Psl of the shift arm 11 in the selecting direction is set at the 1st/2nd gear select position Psl__12, while the position P__sc of the shift arm 11 in the shifting direction is set at the 1st speed shift position Psc__1.

In the step illustrated in FIG. 3B, the position Psc of the shift arm 11 in the shifting direction is set at the neutral position 0 to enable the selecting operation. In the step illustrated in FIG. 3C, the shift arm 11 is set at a 3rd/4th gear select position Psc__34 by the selecting operation. This causes the shift arm 11 to engage the shift piece 21b. In the step illustrated in FIG. 3D, the shift arm 11 is moved from the neutral position to a third speed shift position Psc__3 to establish the third speed.

Referring now to FIG. 4, the control unit 1 has a target position calculator 52 for setting a target position Psc__cmd of the shift arm 11 in the shifting direction and a target position Psl__cmd of the shift arm 11 in the selecting direction, a shift controller 50 that controls a voltage Vsc to be applied to the shift motor 13 such that an actual position Psc of the shift arm 11 in the shifting direction coincides with the target position Psc__cmd, and a selection controller 51 that controls a voltage Vsl to be applied to the selection motor 12 such that an actual position Psl of the shift arm 11 in the selecting direction coincides with the target position Psl__cmd.

The shift controller 50 has a sliding mode controller 53 that employs sliding mode control (corresponding to the response specifying control in the present invention) to determine the voltage Vsc to be applied to the shift motor 13, and a VPOLE__sc calculator 54 that sets a response specifying parameter VPOLE__sc in the sliding mode control.

The selection controller 51 includes a sliding mode controller 55 that employs sliding mode control to determine the voltage Vsl to be applied to the selection motor 12, and a VPOLE__sl calculator 56 that sets a response specifying parameter VPOLE__sl in the sliding mode control.

The sliding mode controller 55 provided in the selection controller 51 models a configuration for moving the shift arm 11 in the selecting direction according to an equation (1) given below and calculates a control value V__sl(k) of a voltage to be applied to the selection motor 12 according to the following equations (2) through (7), thereby conducting the positioning control on the shift arm 11 in the selecting direction.

$$Psl(k+1)=a1\_sl \cdot Psl(k)+a2\_sl \cdot Psl(k-1)+b1_{13}\_sl \cdot V\_sl(k)+b2\_sl \cdot V\_$$

$$sl(k-1) \tag{1}$$

where a1_sl, a2_sl, b1_sl, and b2_sl: Model parameters.

A difference E_sl(k) between an actual position Psl(k) of the shift arm 11 in the selecting direction in a k-th control cycle and a target position Psl_cmd(k−1) in a k−1(th) control cycle is determined according to the following equation (2) by the sliding mode controller 55. Equation (3) given below indicates a switching function σ_sl(k), which corresponds to the linear function in the present invention, for restricting the converging behavior of the difference E_sl(k) in the sliding mode.

$$E\_sl(k)=Psl(k)-Psl\_cmd(k-1) \tag{2}$$

where E_sl(k): Difference in the selecting direction in a k-th control cycle; Pcl(k): Actual position of the shift arm 11 in the selecting direction in the k-th control cycle; and Pcl_cmd(k): Target position of the shift arm 11 in the selecting direction in a k−1(th) control cycle.

$$\sigma\_sl(k)=E\_sl(k)+VPOLE\_sl \cdot E\_sl(k-1) \tag{3}$$

where VPOLE_sl: Switching function setting parameter (−1<VPOLE_sl<0 corresponding to the computing coefficient of the linear function in the present invention).

The switching function in the above equation (3) is expressed as σ_sl(k+1)=σ_sl(k), and introducing the above equations (1) and (2) yields an equivalent control input Ueq_sl(k) of the following equation (4).

$$\begin{aligned}Ueq\_sl(k) = \frac{1}{b1\_sl}\{&(1 + VPOLE\_sl - a1\_sl) \cdot Psl(k) + \\&(VPOLE\_sl - a2\_sl) \cdot Psl(k-1) - \\&b2\_sl \cdot Vsl(k-1) + Psl\_cmd(k) + \\&(VPOLE\_sl - 1) \cdot Psl\_cmd(k-1) - \\&VPOLE\_sl \cdot Psl\_cmd(k-1)\}\end{aligned} \tag{4}$$

where Ueq_sl(k): Equivalent control input in a k-th control cycle.

A reaching law input Urch_sl(k) is calculated according to equation (5) given below, an adaptation law input Uadp_sl(k) is calculated according to equation (6) given below, and a control value Vsl(k) of a voltage applied to the selection motor 12 is calculated according to the following equation (7).

$$Urch\_sl(k) = -\frac{Krch\_sl}{b1\_sl} \cdot \sigma\_sl(k) \tag{5}$$

where Urch_sl(k): Reaching law input in a k-th control cycle; and Krch_sl: Feedback gain.

$$Uadp\_sl(k) = -\frac{Kadp\_sl}{b1\_sl} \cdot \sum_{i=0}^{k} \sigma\_sl(i) \tag{6}$$

where Uadp_sl(k): Adaptation law input in a k-th control cycle; and Kadp_sl: Feedback gain.

$$Vsl(k)=Ueq\_sl(k)+Urch\_sl(k)+Uadp\_sl(k) \tag{7}$$

where V_sl(k): Control value of a voltage to be applied to the selection motor 12 in a k-th control cycle.

The sliding mode controller 53 provided in the shift controller 50 models a configuration for positioning the shift arm 11 in the shifting direction according to an equation (8) given below and calculates a control value V_sc(k) of a voltage to be applied to the shift motor 13 according to the following equations (9) through (15), thereby conducting the positioning control on the shift arm 11 in the shifting direction.

$$Psc(k+1)=a1\_sc \cdot Psc(k)+a2\_sc \cdot Psc(k-1)+b1\_sc \cdot Vsc(k)+b2\_sc \cdot Vsc(k-1) \tag{8}$$

where a1_sc, a2_sc, b1_sc, and b2_sc: Model parameters.

A difference E_sc(k) between an actual position Psc(k) of the shift arm 11 in the shifting direction in a k-th control cycle and a target position Psc_cmd(k−1) in a k−1(th) control cycle is determined according to the following equation (9) by the sliding mode controller 53. Equation (10) given below indicates a switching function σ_sc(k), which corresponds to the linear function in the present invention, for restricting the converging behavior of the difference E_sc(k) in the sliding mode.

$$E\_sc(k)=Psc(k)-Psc\_cmd(k-1) \tag{9}$$

where E_sc(k): Difference in the shifting direction in a k-th control cycle; Psc(k): Actual position of the shift arm 11 in the shifting direction in the k-th control cycle; and Psc_cmd(k): Target position of the shift arm 11 in the shifting direction in a k−1(th) control cycle.

$$\sigma\_sc(k)=E\_sc(k)+VPOLE\_sc \cdot E\_sc(k-1) \tag{10}$$

where VPOLE_sc: Switching function setting parameter (−1<VPOLE_sc<1 corresponding to the computing coefficient of the linear function in the present invention).

A switching function integral value SUM_σsc(k) is calculated according to the following equation (11).

$$SUM\_\sigma sc(k)=SUM\_\sigma sc(k-1)+\sigma\_sc(k) \tag{11}$$

where SUM_σsc(k): Switching function integral value in a k-th control cycle.

The switching function in the above equation (10) is expressed as σ_sc(k+1)=σ_sc(k), and introducing the above equations (8) and (9) yields an equivalent control input Ueq_sc(k) of the following equation (12).

$$\begin{aligned}Ueq\_sc(k) = \frac{1}{b1\_sc}\{&(1 + VPOLE\_sc - a1\_sc) \cdot Psc(k) + \\&(VPOLE\_sc - a2\_sc) \cdot Psc(k-1) - \\&b2\_sc \cdot Vsc(k-1) + Psc\_cmd(k) + \\&(VPOLE\_sc - 1) \cdot Psc\_cmd(k-1) - \\&VPOLE\_sc \cdot Psc\_cmd(k-1)\}\end{aligned} \tag{12}$$

where Ueq_sc(k): Equivalent control input in a k-th control cycle.

A reaching law input Urch_sc(k) is calculated according to equation (13) given below, an adaptation law input Uadp_sc(k) is calculated according to equation (14) given below, and a control value Vsc(k) of a voltage applied to the shift motor 13 is calculated according to the following equation (15).

$$\text{Urch\_sc}(k) = -\frac{\text{Krch\_sc}}{b1\_sc} \cdot \sigma\_sc(k) \tag{13}$$

where Urch__sc(k): Reaching law input in a k-th control cycle; and Krch__sc: Feedback gain.

$$\text{Uadp\_sc}(k) = -\frac{\text{Kadp\_sc}}{b1\_sc} \cdot \text{SUM\_}\sigma sc(k) \tag{14}$$

where Uadp__sc(k): Adaptation law input in a k-th control cycle; and Kadp__sc: Feedback gain.

$$Vsc(k) = Ueq\_sc(k) + Urch\_sc(k) + Uadp\_sc(k) \tag{15}$$

where Vsc(k): Control value of a voltage to be applied to the shift motor 13 in a k-th control cycle.

In the transmission 80, there are some cases where a shift occurs between the target value Psl__cmd of each preset speed selection position and a target value Psl__cmd* corresponding to a true selected position because of mechanical play, individual variations of parts, or the like. FIGS. 5A and 5B illustrate a case where such a shift takes place at the 3rd/4th gear select position.

Referring to FIG. 5A, a target value Psl__cmd34 of the 3rd/4th gear select position is shifted toward the shift piece 21a with respect to a true target value Psl__cmd34*. Thus, if the shift arm 11 positioned at Psl__cmd34 is shifted from the neutral position to the 3rd speed shift position, then the shift arm 11 and the shift piece 21a interfere with each other, preventing the shifting operation from being accomplished.

The shift arm 11 and all shift pieces 21a through 21d are chamfered. Therefore, in the case of manual transmission (MT) in which the shifting operation and the selecting operation are performed by drivers' operating force rather than an actuator, such as a motor, the driver who feels the interference against the shift arm 11 slightly reduces his or her holding force in the selecting direction. This causes the shift arm 11 to be shifted toward the true target value Psl__cmd34* along the chamfered portion, as illustrated in FIG. 5B, thus allowing the shifting operation to be accomplished.

FIGS. 6A and 6B are graphs showing a transition of the actual position Psc in the shifting direction and the position Psl in the selecting direction of the shift arm 11 during the shifting operation in the MT described above. In the graph of FIG. 6A, the axis of ordinates indicates Psc in the shifting direction, while the axis of abscissas indicates time t. In the graph of FIG. 6B, the axis of ordinates indicates the actual position Psl in the selecting direction, while the axis of abscissas indicates time t, as in the graph of FIG. 6A.

The shifting operation is begun at $t_{10}$ in the graphs of FIGS. 6A and 6B, and the shift arm 11 starts moving toward a target value Psc_cmd3 indicating the 3rd speed shift position, as shown in FIG. 6A. At $t_{11}$, the shift arm 11 and the shift piece 21a interfere with each other, and the shift arm 11 is shifted to the true target value Psl__cmd34* from the target value Psl__cmd34 of the 3rd/4th gear select position from $t_{11}$ through $t_{12}$, as illustrated in FIG. 6B. This allows the shift arm 11 to move to the target value Psc__cmd3 of the 3rd shift position, as shown in FIG. 6A, while avoiding the interference between the shift arm 11 and the shift piece 21a.

In an automated manual transmission (AMT) according to the present embodiment in which the shifting operation and the selecting operation are performed by a shift motor 13 and a selection motor 12, if an attempt is made to position and hold the shift arm 11 at the target value Psl__cmd34 of the 3rd/4th gear select position, then the shift arm 11 cannot be shifted in the selecting direction when the shift arm 11 and the shift piece 21a interfere with each other. This prevents the shifting operation from being accomplished.

FIG. 7A illustrates a case where the shift arm 11 has been slightly shifted in the selecting direction because of its interference with the shift piece 21a when the shift arm 11 at the target value Psl__cmd34 of the 3rd/4th gear select position in the AMT is moved to the target value Psc__cmd3 of the 3rd speed shift position. In this case, the selection controller 51 determines an output voltage Vsl to be applied to the selection motor 12 such that the position of the shift arm 11 in the selecting direction is set back to Psl__cmd34 by eliminating the shift E__sl. This causes a force Fsl to be produced in the selecting direction.

Here, a component of Fsl in the direction of a tangent α on chamfered portions of the shift arm 11 and the shift piece 21a is denoted as Fsl1, a component in a β direction of the normal line of the tangent α is denoted as Fsl2, a component in an α direction of the tangent of a force Fsc in the shifting direction generated by the shifting operation is denoted as Fsc1, and a component in a β direction of the normal line is denoted as Fsc2. The shifting operation stops at the moment Fsc1 and Fsl1 are balanced.

FIG. 7B shows displacement of the shift arm 11 during the shifting operation described above. The axis of ordinates of the upper graph indicates the actual position Psc of the shift arm 11 in the shifting direction, the axis of ordinates of the lower graph indicates the actual position Psl of the shift arm 11 in the selecting direction, and the axes of abscissas provide common time axes t. At $t_{20}$, the shifting operation is begun. The target value Psl__cmd34 of the 3rd/4th gear select position has been shifted from the true target value Psl__cmd34*, so that the shift arm 11 and the shift piece 21a start to interfere with each other at $t_{21}$.

The chamfered portion causes the shift arm 11 to be slightly shifted in the selecting direction, but to stop moving in the selecting direction at $t_{22}$ when Fsc1 and Fsl1 are balanced and also to stop moving in the shifting direction. This interrupts the shifting operation, preventing the shift arm 11 from reaching the target value Psc__cmd3 of the 3rd speed shift position.

At this time, the shift controller 50 increases the control value Vsc of the voltage applied to the shift motor 13 to move the shift arm 11 to the target value Psc__cmd3 of the 3rd speed shift position. The selection controller 51 increases the control value Vsl of the voltage applied to the selection motor 12 to move the shift arm 11 to the target value Psl__cmd34 of the 3rd/4th speed selection position. This causes the voltage Vsc to be applied to the shift motor 13 to become excessively high and the voltage Vsl to be applied to the selection motor 12 to become excessively high, which may damage the shift motor 13 and the selection motor 12.

To avoid the danger, the selection controller 51 uses different switching function setting parameters VPOLE__sl in the above equation (3) for the selecting operation and the shifting operation, respectively, so as to change a disturbance suppressing capability level. The graphs in FIG. 8 illustrate response specifying characteristics of the sliding mode controller 55 of the selection controller 51. The graphs in FIG. 8 show responses of a control system observed when VPOLE__sl is set to −0.5, −0.8, −0.99, and −1.0, respectively, with a step disturbance d being applied under a condition wherein the switching function σ__sl=0 and the difference E__sl=0. The axes of ordinates indicate the difference E_sl, the switching function σ_sl, and disturbance d, respectively, from the top, while the axes of abscissas all indicate time k.

As is obvious from FIG. 8, as an absolute value of VPOLE_sl is set to be smaller, the influences exerted on the difference E_sl by the disturbance d are reduced. Conversely, as an absolute value of VPOLE_sl is increased toward 1, the difference E_sl permitted by the sliding mode controller 55 increases. At this time, the behavior of the switching function σ_sl is the same regardless of the value of VPOLE_sl, so that it can be seen that the level of capability level of suppressing the disturbance d can be specified by setting the value of VPOLE_sl.

A VPOLE_sl calculator 56 of the selection controller 51 calculates different values of VPOLE_sl for the shifting operation and a non-shifting operation (the selecting operation), as shown in the following equation (16).

$$\text{VPOLE\_sl} = \begin{cases} \text{VPOLE\_sl\_l: Shifting mode} \\ \text{VPOLE\_sl\_h: Non-shifting mode} \end{cases} \quad (16)$$

where e.g., VPOLE_sl_l=−0.95 and VPOLE_sl_h=−0.7 are set so that |VPOLE_sl_l|>|VPOLE_sl_h|.

The selection controller 51 determines that the shifting operation is being performed if the relationships expressed by the following two equations (17) and (18) hold.

$$|Psc\_cmd| > Psc\_cmd\_vp(\approx 0.3 \text{ mm}) \quad (17)$$

where Psc_cmd: Target value in the shifting direction; and Psc_cmd_vp: Preset reference value (e.g., 0.3 mm) of the amount of displacement from a neutral position (Psc_cmd=0).

$$|\Delta Psl| < dpsl\_vp(\approx 0.1 \text{ mm/step}) \quad (18)$$

where ΔPsl: Amount of displacement in the selecting direction from the preceding control cycle; and dpsl_vp: Preset reference value (e.g., 0.1 mm/step) of displacement amount a control cycle.

FIG. 9A shows the displacement of the shift arm 11 when the disturbance suppressing capability level is set to be lower than that used for the selecting operation according to the above equation (16), VPOLE_sl in the shifting operation being set as VPOLE_sl_l, and the shift arm 11 is shifted to the target value Psc_cmd3 of the 3rd speed shift position, as in the case shown in FIG. 7A.

In FIG. 9A, the disturbance suppressing capability level in the sliding mode controller 55 of the selection controller 51 has been set to be low, so that the interference between the shift arm 11 and the shift piece 21a causes the shift arm 11 to be shifted in the selecting direction from the target position Psl_cmd34 of the 3rd/4th gear select position. When the difference E_sl from the Psl_cmd34 is produced, the voltage Vsl applied to the selection motor 12 is reduced to cancel the difference E_sl.

Therefore, the force Fsl in the selecting direction produced by the drive of the selection motor 12 is reduced, and the component Fsc1 in the α direction of the tangent of the force Fsc in the shifting direction that is generated by the drive of the shift motor 13 becomes larger than the component Fsl1 in the α direction of the tangent of Fsl. This causes a force Ft in the α direction of the tangent to be generated. The force Ft moves the shift arm 11 in the α direction of the tangent, thus displacing the position of the shift arm 11 in the selecting direction from Psl_cmd to Psl_cmd*. This makes it possible to prevent the shift arm 11 and the shift piece 21a from interfering with each other, permitting the shift arm 11 to move in the shifting direction.

The graphs in FIG. 9B show displacement of the shift arm 11 in FIG. 9A explained above. The axes of ordinates indicate the actual position Psc of the shift arm 11 in the shifting direction, the actual position Psl thereof in the selecting direction, and the switching function setting parameter VPOLE_sl from the top. The axes of abscissas all indicate time t.

The moment the shifting operation is begun at $t_{31}$, the setting of VPOLE_sl in the sliding mode controller 55 is switched from VPOLE_sl_h to VPOLE_sl_l by the VPOLE_sl calculator 56 of the selection controller 51, so that the disturbance suppressing capability level of the sliding mode controller 55 is lowered.

When the shift arm 11 and the shift piece 21a interfere with each other at $t_{32}$, the shift arm 11 shifts in the selecting direction from the 3rd/4th gear target position Psl_cms34. At $t_{33}$, the position of the shift arm 11 in the selecting direction reaches the true 3rd/4th gear target position Psl_cmd34*. Thus, shifting the shift arm 11 in the selecting direction prevents the shift piece 21a from interfering with the shifting operation, thus displacing the shift arm 11 in the shifting direction from the neutral position to the 3rd speed shift target position Psc_cmd3.

Referring now to FIG. 10, the shift controller 50 establishes each speed by implementing the following four modes (Mode1 through Mode4) in the shifting operation. The shift controller 50 changes the switching function setting parameter VPOLE_sc according to the following equation (19) in each mode. Thus, changing the switching function setting parameter VPOLE_sc makes it possible to change the disturbance suppressing capability level of the shift controller 50, as in the case of the aforesaid selection controller 51.

$$\text{VPOLE\_sc} = \begin{cases} \text{VPOLE\_sc1}l(=-0.8): & Mode1(|Psc(k)| < |Psc\_def|) \\ \text{VPOLE\_sc1}2(=-0.98): & Mode1(|Psc(k)| \geq |Psc\_def|) \\ \text{VPOLE\_sc2}(=-0.85): & Mode2(|Psc\_def| \leq |Psc(k)| \leq |Psc\_scf|) \\ \text{VPOLE\_sc3}(=-0.7): & Mode3(|Psc(k)| > |Psc\_scf|) \\ \text{VPOLE\_sc4}(=-0.9): & Mode4 \end{cases} \quad (19)$$

where Psc_def: Standby position of a synchronizer ring; and Psc_scf: Position where the coupling sleeve and the synchronizer ring comes in contact.

FIG. 10A shows a graph in which the axis of ordinates indicates the actual position Psc and the target position Psc_cmd of the shift arm 11 in the shifting direction, and the axis of abscissas indicates time t. FIG. 10B shows a graph in which the axis of ordinates indicates the switching function setting parameter VPOLE_sc, and the axis of abscissas indicates time t, which also applies to the graph of FIG. 10A.

(1) Mode1 ($t_{40}$ to $t_{42}$: Target Value Follow-Up & Compliance Mode)

The VPOLE_sc calculator 54 of the shift controller 50 shown in FIG. 4 sets and holds VPOLE_sc at VPOLE_sc1l (=−0.8) until the actual position Psc of the shift arm 11 (refer to FIG. 2A) reaches the standby position Psc_def of the synchronizer ring 23 (Psc<Psc_def) after the shifting operation is begun from the neutral position. This enhances the disturbance suppressing capability level of the shift controller 50, resulting in enhanced capability of the shift arm 11 to follow the target position Psc_cmd.

At $t_{41}$ when the actual position Psc of the shift arm 11 reaches the standby position Psc_def of the synchronizer ring 22, the VPOLE_sc calculator 54 sets VPOLE_sc to VPOLE_scl2 (=−0.98) so as to lower the disturbance suppressing capability level of the shift controller 50. This provides a shock absorbing effect when the sleeve ring 22 and the synchronizer ring 23 come into contact, making it possible to restrain the occurrence of percussive noises or restrain the coupling sleeve 22 from being forcibly pushed into the synchronizer ring 23.

(2) Mode2 ($t_{42}$ to $t_{43}$: Rotational Synchronization Control Mode)

After conditions Psc_def≦Psc≦Psc_scf and ΔPsc<ΔPsc_sc (ΔPsc_sc: Determination value of the contact between the coupling sleeve 22 and a synchronizer ring 22b) are satisfied, the target value Psc_cmd is set to Psc_sc, and VPOLE_sc is set to VPOLE_sc2 (=−0.85) to apply an appropriate pressing force to the synchronizer ring 22b. Thus, the rotational speeds of the coupling sleeve 22 and the third forward gear 7c on the input side are synchronized.

(3) Mode3 ($t_{43}$ to $t_{44}$: Static Mode)

When a condition Psc_scf<Psc is satisfied at $t_{43}$, the target value Psc_cmd is set to a shift completion target value Psc_end. Furthermore, in order to prevent Psc from overshooting Psc_cmd (if an overshoot happens, a noise from a collision against a stopper member (not shown) is produced), the switching function integral value SUM_σsc is reset, and VPOLE_sc is set to VPOLE_sc3 (=−0.7) to increase the disturbance suppressing capability. This causes the coupling sleeve 22 to pass by the synchronizer ring 22b and engage the third forward gear 7c on the input side.

(4) Mode4 ($t_{44}$ and after: Hold Mode)

After completion of the shifting operation and during the selecting operation, VPOLE_sc is set to VPOLE_sc4 (=−0.9) to lower the level of the disturbance suppressing performance in the shift controller 50 to reduce electric power supplied to the shift motor 13 so as to save electric power. As illustrated in FIG. 11A, if the selecting operation is performed by moving the shift arm 11 from the 5th/6th gear select position to the 1st/2nd gear select position with a positional shift E_Psc present between the shift piece 21b and the shift piece 21c, then the chamfered portions of the shift arm 11 and the shift piece 21b come in contact.

At this time, if the disturbance suppressing capability of the shift controller 50 is maintained at a high level, then a component Fsl' in the tangential direction of a chamfered portion of the force Fsl in the selecting direction produced by the drive of the selection motor 12 interferes with a component Fsc' in the tangential direction of a chamfered portion of the force Fsc in the shifting direction produced by the drive of the shift motor 13, causing the shifting operation of the shift arm 11 to be interrupted. Furthermore, conducting the control for positioning the shift arm 11 to a target position by the shift controller 50 and the selection controller 51 will increase the voltage applied to the selection motor 12 and the shift motor 13, leading to possible damage to the selection motor 12 and the shift motor 13.

In the selecting operation, therefore, VPOLE_sc is set to VPOLE_sc4 (=−0.9) to lower the level of disturbance suppressing capability of the shift controller 50 so as to decrease the force Fsc in the shifting direction, as shown in FIG. 11B. With this arrangement, the shift arm 11 shifts in the shifting direction, as indicated by a path x in FIG. 11B, so that the shift arm 11 can be moved to the 1st/2nd gear select position, avoiding the interference with the shift piece 21b.

Referring now to the flowcharts shown in FIG. 12 through FIG. 19, and FIG. 21, the procedure for carrying out the control over the transmission 80 by the control unit 1 will be explained.

FIG. 12 shows a main flowchart of the control unit 1. When the driver of the vehicle operates the accelerator pedal 95 (refer FIG. 1) or the brake pedal 99 in STEP1, the control unit 1 determines, depending on which is operated, a driving force index Udrv for determining the driving force to be applied to the drive wheels 94 according to the following equation (20).

$$Udrv = \begin{cases} AP & \text{(When the accelerator pedal is depressed)} \\ Kbk \times BK & \text{(When the brake pedal is depressed)} \end{cases} \quad (20)$$

where Udrv: Driving force index; AP: Degree of opening of the accelerator pedal; BK: Brake depressing force; and Kbk: Coefficient used to convert a brake depressing force (0 to maximum) into a degree of opening of the accelerator pedal (0 to −90 degrees).

Then, based on the driving force index Udrv, the control unit 1 determines in STEP2 whether to perform speed changing operation of the transmission 80. If it is determined to perform the speed changing operation, then the transmission control is carried out to perform the speed changing operation by deciding a target speed. In the subsequent STEP3, the control unit 1 carries out the clutch control to control the slip rate of the clutch assembly 82.

Referring now to the flowcharts shown in FIG. 13 through FIG. 15, the procedure for carrying out the transmission control by the control unit 1 will be explained. The control unit 1 first checks in STEP10 of FIG. 13 whether the driver of the vehicle has issued a request for reverse. If the request for reverse has been issued, then the control unit 1 proceeds to STEP20 wherein it sets the gear selection target value NGEAR_cmd to −1, which denotes reverse, and then proceeds to STEP12.

If it is determined in STEP10 that no request for reverse has been issued, then the control unit 1 proceeds to STEP11 wherein it applies the driving force index Udrv and the vehicle speed VP of the vehicle to the Udrv, VP/NGEAR_cmd map shown in FIG. 13 so as to determine the gear selection target value NGEAR_cmd. Table 1 below shows the relationship between the gear selection target value NGEAR_cmd and selected gear positions.

TABLE 1

Correspondence between gear selection target value NGEAR_cmd and selected gear position

| NGEAR_cmd | −1 | 1 | 2 | 3 | 4 | 5 | 0 |
|---|---|---|---|---|---|---|---|
| Gear position | Reverse | 1st gear | 2nd gear | 3rd gear | 4th gear | 5th gear | Neutral |

In the subsequent STEP12, the control unit 1 determines whether a current gear select position NGEAR of the transmission 80 coincides with a gear selection target value NGEAR_cmd. If it is determined that the gear select position NGEAR coincides with the gear selection target value NGEAR_cmd, then the control unit 1 proceeds to STEP15 to terminate the transmission control without carrying out the speed changing operation on the transmission 80.

If it is determined in STEP12 that the gear select position NGEAR of the transmission 80 does not coincide with the gear selection target value NGEAR_cmd, then the control unit 1 proceeds to STEP13 wherein the control unit 1 starts a speed changing operation reference timer for determining the timing of each processing in the speed changing operation to be performed in the next STEP14. Thus, the control unit 1 executes the speed changing operation in STEP14 and then proceeds to STEP13 where it terminates the transmission control.

The speed changing operation of the transmission is performed by three steps, namely, a clutch OFF step in which the clutch assembly 82 (refer to FIG. 1) is set to a clutch OFF state to enable the shifting/selecting operation of the transmission 80, a gear position changing step in which the shifting/selecting operation of the transmission 80 is performed to change the gear selection position NGEAR to the gear selection target value NGEAR_cmd in the clutch OFF state, and a clutch ON step in which the clutch assembly 82 is set back to the clutch ON state after the gear position changing step is finished.

To grasp the timings from the moment the speed changing operation reference timer is started in STEP13 to the moment each step is completed, clutch OFF completion time TM_CLOFF, gear position change completion time TM_SCHG, and clutch ON completion time TM_CLON are preset (TM_CLOFF<TM_SCHG<TM_CLON).

The moment the control unit 1 starts the speed changing operation reference timer in STEP13, it starts the clutch OFF processing and turns the clutch assembly 82 off. When counting time tm_shift of the speed changing operation reference timer exceeds the clutch OFF completion time TM_CLOFF, the gear position changing step is begun. When the counting time tm_shift of the speed changing operation reference timer reaches the gear position change completion time TM_SCHG, the control unit 1 beings the clutch ON step to turn the clutch assembly 82 on.

The flowcharts shown in FIG. 14 and FIG. 15 illustrate the procedure for implementing the speed changing operation of the transmission 80 by the control unit 1 after the clutch OFF processing is begun. The control unit 1 first determines in STEP30 whether a current gear selection position NGEAR of the transmission 80 coincides with the gear selection target value NGEAR_cmd.

If it is determined that the gear selection position NGEAR coincides with the gear selection target value NGEAR_cmd and that the speed changing operation is completed, then the control unit 1 proceeds to STEP45 wherein it clears clocking time tm_shift on a speed changing operation reference timer. In the next STEP46, the control unit 1 resets a gear disengagement completion flag F_SCN (F_SCN=0) set upon completion of gear disengagement processing in the transmission 80, and resets a select completion flag F_SLF (F_SLF=0) set upon completion of the selecting operation in the transmission 80.

The control unit 1 then proceeds to STEP61 wherein the control unit 1 maintains a current gear selection position by holding the target position Psc_cmd of the shift arm 11 in the shifting direction by the shift controller 50 and the target position Psl_cmd of the shift arm 11 in the selecting direction by the selection controller 51 at current values. The control unit 1 then proceeds to STEP33 of FIG. 15.

At this time, the VPOLE_sc calculator 54 of the shift controller 50 sets the response specifying parameter VPOLE_sc in the sliding mode controller 53 of the shift controller 50 to VPOLE_sc4 (=−0.9). This lowers the level of disturbance suppressing capability of the shift controller 50, thus saving electric power of the shift motor 13.

Furthermore, the VPOLE_sl calculator 56 of the selection controller 51 sets the response specifying parameter VPOLE_sl in the sliding mode controller 55 of the selection controller 51 to VPOLE_sl_1 (=−0.95). This lowers the level of disturbance suppressing capability of the shift controller 50, thus saving electric power in the selection motor 12.

If, on the other hand, it is determined in STEP30 that a current gear selection position NGEAR of the transmission 80 does not coincide with the gear selection target value NGEAR_cmd and that the speed changing operation of the transmission 80 is in process, then the control unit 1 proceeds to STEP31.

In STEP31, the control unit 1 determines whether the clocking time tm_shift on the speed changing operation reference timer has exceeded a clutch OFF time TM_CLOFF. If it is determined that the clocking time tm_shift on the speed changing operation reference timer has not exceeded the clutch OFF completion time TM_CLOFF and the clutch OFF step has not been completed, then the control unit 1 proceeds to STEP32 wherein it carries out the same processing as that in STEP61 to maintain a current gear selection position.

If, on the other hand, it is determined in STEP31 that the clocking time tm_shift on the timer has exceeded the clutch OFF completion time TM_CLOFF and the clutch OFF step has been completed, then the control unit 1 proceeds to STEP50 wherein the control unit 1 determines whether the clocking time tm_shift on the timer has exceeded a gear position change completion time TM_SCHG.

In STEP50, if it is determined that the clocking time tm_shift on the timer has not exceeded the gear position change completion time TM_SCHG and the gear position change step is being implemented, then the control unit 1 proceeds to STEP51 to perform the shifting/selecting operation, and then proceeds to STEP33 of FIG. 15.

If, on the other hand, it is determined in STEP50 that the clocking time tm_shift on the timer has exceeded the gear position change completion time TM_SCHG and the gear position change step has been completed, then the control unit 1 proceeds to STEP60 wherein the control unit 1 determines whether the clocking time tm_shift on the timer has exceeded a clutch ON completion time TM_CLON.

In STEP60, if it is determined that the clocking time tm_shift on the timer has not exceeded the clutch ON completion time TM_CLON and the clutch ON step is being implemented, then the control unit 1 performs the processing in the aforesaid STEP61, and then proceeds to STEP33 of FIG. 15.

If, on the other hand, it is determined in STEP60 that the clocking time tm_shift on the timer has exceeded the clutch ON completion time TM_CLON (TM_CLON<tm_shift) and the clutch ON step has been completed, then the control unit 1 proceeds to STEP70 wherein the control unit 1 sets the current gear selection position NGEAR to the gear selection target value NGEAR_cmd. The control unit 1 then proceeds to STEP33 of FIG. 15.

Processing of STEP33 through STEP38 and STEP80 shown in FIG. 15 is carried out by the sliding mode controller 53 of the shift controller 50. In STEP33, the sliding mode controller 53 calculates E_sc(k) according to the above equation (9) and also calculates σ_sc(k) according to the above equation (10).

If it is found in the subsequent STEP34 that a flag F_Mode2 to 3, which is set when moving from Mode2 to Mode3, has been set (F_Mode2 to 3=1), then the control unit 1 proceeds to STEP35 to reset the switching function integral value SUM_σsc(k) calculated according to the above equation (11)(SUM_σsc=0). On the other hand, if it is found in STEP34 that the flag F_Mode2 to 3 has been reset (F_Mode2 to 3=0), then the control unit 1 proceeds to STEP80 to update the switching function integral value SUM__sc(k) according to the above equation (11), and then proceeds to STEP36.

The sliding mode controller 53 calculates the equivalent control input Ueq_sc(k), the reaching law input Urch_sc(k), and the adaptation law input Uadp_sc(k) in STEP36 according to the above equations (12) to (14), and further calculates a control value Vsc(k) of the voltage to be applied to the shift motor 13 according to the above equation (15) in STEP37 so as to control the shift motor 13.

In the subsequent STEP38 through STEP40, processing is carried out by the sliding mode controller 55 of the selection controller 51. In STEP38, the sliding mode controller 55 calculates E_sl(k) according to the above equation (2), and further calculates σ_sl(k) according to the above equation (3).

In the subsequent STEP39, the sliding mode controller 55 calculates the equivalent control input Ueq_sl(k), the reaching law input Urch_sl(k), and the adaptation law input Uadp_sl(k) according to the above equations (4) to (6), and further calculates a control value Vsl(k) of the voltage to be applied to the selection motor 12 according to the above equation (7) in STEP40 so as to control the selection motor 12.

FIG. 16 shows a flowchart of the shifting/selecting operation in STEP51 of FIG. 14. In STEP90, if it is determined that the gear disengagement completion flag F_SCN has been reset (F_SCN=0) and the gear disengagement is in process, then the control unit 1 proceeds to STEP91.

Processing in STEP91 and STEP92 is carried out by the target position calculator 52 shown in FIG. 4. The target position calculator 52 holds the target position Psl_cmd of the shift arm 11 in the selecting direction at a current position in STEP91, and sets the target position Psc_cmd of the shift arm 11 in the shifting direction to zero, which indicates the neutral position, in STEP92. Processing in STEP93 is carried out by the VPOLE_sc calculator 54 shown in FIG. 4 and the VPOLE_sl calculator 56. The VPOLE_sl calculator 56 sets VPOLE_sl to VPOLE_sl_l (−0.95), and the VPOLE_sc calculator 54 sets VPOLE_sc to VPOLE_scll (=−0.8).

With this arrangement, the level of disturbance suppressing capability of the selection controller 51 is lowered, expanding the permissible range of the shift of the shift arm 11 in the selecting direction. Thus, the shift arm 11 can be smoothly moved in the shifting direction, minimizing the influences of interference between the shift arm 11 and a shift piece 21.

In the subsequent STEP94, if the position (in an absolute value) of the shift arm 11 in the shifting direction is below a preset neutral determination value Psc_N (e.g., 0.15 mm), then it is determined that the gear disengagement processing is finished, and the control unit 1 proceeds to STEP95 to set the gear disengagement completion flag F_SCN (F_SCN=1) before it proceeds to STEP96 wherein it terminates the shifting/selecting operation.

Meanwhile, if it is determined in STEP90 that the gear disengagement completion flag F_SCN (F_SCN=1) has been set, indicating the end of the gear disengagement processing, then the control unit 1 proceeds to STEP100. Processing steps in STEP100 through STEP103 and STEP110 are implemented by the target position calculator 52. The target position calculator 52 determines in STEP100 whether a selection completion flag F_SLF has been set.

If it is determined that the selection completion flag F_SLF has been reset (F_SLF=0), meaning that the selecting operation is in process, then the target position calculator 52 proceeds to STEP101 to search a NGEAR_cmd/Psl_cmd_table map shown in FIG. 16 to acquire a set value Psl_cmd_table of each gear in the selecting direction that corresponds to NGEAR_cmd.

In the subsequent STEP103, the target position calculator 52 holds the target value Psc_cmd of the shift arm 11 in the shifting direction at a current value, and sets Psc_cmd_tmp specifying an increase width of a target value in the shifting direction to zero. In the next STEP104, processing is carried out by a VPOLE_sc calculator 54 and the VPOLE_sl calculator 56. The VPOLE_sl calculator 56 sets VPOLE_sl to VPOLE_sl_h (=−0.7), and the VPOLE_sc calculator 54 sets VPOLE_sc to VPOLE_sc4 (=−0.9).

Thus, the disturbance suppressing capability of the shift controller 50 is lowered, and the shift arm 11 easily shifts in the shifting direction during the selecting operation, allowing the selecting operation to be smoothly accomplished even if the shift arm 11 and a shift piece 21 interfere with each other, as described above with reference to FIG. 11B.

If an absolute value |Psl−Psl_cmd| of a difference between the current position and a target position of the shift arm 11 in the selecting direction reduces below a selection completion determination value E_Pslf (e.g., 0.15 mm) in STEP105, and if a moving speed ΔPsl of the shift arm 11 in the selecting direction reduces below a selection speed convergence determination value D_Pslf (e.g., 0.1 mm/step) in STEP106, then the control unit 1 determines that the selecting operation is completed and proceeds to STEP107. The control unit 1 then sets the selection completion flag F_SLF (F_SLF=1) and proceeds to STEP96 wherein it terminates the shifting/selecting operation.

Meanwhile, if it is determined in STEP100 that the selection completion flag F_SLF has been set, indicating the end of the selecting operation, then the control unit 1 proceeds to STEP110. The processing in STEP110 through STEP111 is implemented by the target position calculator 52. The target position calculator 52 holds the target position Psl_cmd of the shift arm 11 in the shifting direction at a current value in STEP110, and then calculates a rotational synchronization target value, which will be discussed hereinafter in STEP111.

Processing in the next STEP112 is carried out by a VPOLE_sl calculator 56. The VPOLE_sl calculator 56 sets VPOLE_sl to VPOLE_sl_l (=−0.95). Thus, the disturbance suppressing capability of the selection controller 51 is lowered, and the shifting operation of the shift arm 11 can be smoothly accomplished even if the shift arm 11 and a shift piece 21 interfere with each other, as described above with reference to FIG. 9. The control unit 1 then proceeds from STEP112 to STEP96 wherein it terminates the shifting/selecting operation.

FIG. 17 is a flowchart of the calculation of a rotational synchronization target value in STEP111 of FIG. 16. The calculation of the rotational synchronization target value is carried out mainly by the target position calculator 52.

In STEP120, the target position calculator 52 searches an NGEAR_cmd/Psc_def,_scf,_end,_table map shown in FIG. 17 to acquire a standby position Psc_def of a synchronizer ring in each of synchronizers 2a to 2c and each of the reverse gear trains 83, 85, and 86 that correspond to the gear selection target value NGEAR_cmd, a position Psc_scf where the rotational synchronization between the coupling sleeve and synchronized gears (the 1st forward gear 9a on the output side, the 2nd forward gear 9b on the output side, the 3rd forward gear 7c on the input side, the 4th forward gear 7d on the input side, the 5th forward gear 7e on the input side, the 6th forward gear 7f on the input side, the 2nd reverse gear 83, and the 3rd reverse gear 86) through the intermediary of the synchronizer rings begins, a position Psc_sc where the rotational synchronization ends, and a position Psc_end where the shifting operation ends.

In the subsequent STEP121, the target position calculator 52 acquires a displacement speed D_Psc_cmd_table of the shifting operation based on the gear selection target value NGEAR_cmd. Shift shocks at a low gear and the occurrence of noises of contact between a synchronizer ring and the coupling sleeve are restrained by changing the displacement speed D_Psc_cmd_table according to a selected speed.

In the next STEP122, the target position calculator 52 sets Psc_def_table, Psc_scf_table, Psc_sc_table, Psc_end_table, and D_Psc_cmd_table acquired by the aforesaid map search to corresponding target values Psc_def, Psc_scf, Psc_sc, Psc_end, and D_Psc_cmd, respectively. In the following STEP123, a halfway target position Psc_cmd_tmp of the shift arm 11 in the shifting operation is set.

After STEP124 of FIG. 18, processing of Mode1 through Mode4 described above is carried out. If it is determined in STEP124 that the position Psc of the shift arm 11 in the shifting direction has not exceeded Psc_scf and the rotational synchronization of the coupling sleeve and a synchronizer ring is not completed, then the control unit 1 proceeds to STEP125.

In STEP125, the control unit 1 sets a Mode 1·2 flag F_mode12 indicating that the processing of Mode1 or Mode2 is being implemented (F_mode12=1). In the next STEP126, if it is determined that the position Psc of the shift arm 11 in the shifting direction has not exceeded Psc_def, that is, if the shift arm 11 has not exceeded a standby position of a synchronizer ring, then the control unit 1 proceeds to STEP127.

In STEP127, the processing of Mode1 is implemented. The VPOLE_sc calculator 54 of the shift controller 50 sets VPOLE_sc to VPOLE_sc_11 (=−0.8). This increases the level of disturbance suppressing capability of the shift controller 50, leading to improved capability of following the target position Psc_cmd.

If it is determined in STEP126 that the position Psc of the shift arm 11 in the shifting direction has exceeded Psc_def and the shift arm 11 has reached the standby position of the synchronizer ring, then the control unit 1 proceeds to STEP160 wherein it determines whether a change amount ΔPsc of the position of the shift arm 11 in the shifting direction has exceeded a determination value ΔPsc_sc of contact between the coupling sleeve and the synchronizer ring.

If it is determined that ΔPsc is still below ΔPsc_sc, indicating that the coupling sleeve and the synchronizer ring are not yet in contact, then the control unit 1 proceeds to STEP161. If ΔPsc has exceeded ΔPsc_sc, indicating that the coupling sleeve and the synchronizer ring are in contact, then the control unit 1 proceeds to STEP170.

In STEP161, processing of Mode1 is carried out. The VPOLE_sc calculator 54 sets VPOLE_sc to VPOLE_sc12 (=−0.98). This lowers the level of disturbance suppressing capability of the shift controller 50, making it possible to reduce an impact when the coupling sleeve and the synchronizer ring comes into contact.

In STEP170, processing of Mode2 is carried out. The VPOLE_sc calculator 54 sets VPOLE_sc to VPOLE_sc2 (=−0.85). This increases the level of disturbance suppressing capability of the shift controller 50, making it possible to apply an appropriate pressing force to the synchronizer ring so as to synchronize the rotational speed of the coupling sleeve and a synchronized gear.

In STEP171, the target position calculator 52 sets Psc_sc to the target position Psc_cmd of the shift arm 11 in the shifting direction, and proceeds to STEP130 wherein the processing for calculation of rotational synchronization target value is terminated.

Meanwhile, if it is determined in STEP124 that the position Psc of the shift arm 11 in the shifting direction has exceeded Psc_scf, that is, if the synchronization of the rotational speeds of the coupling sleeve and the synchronized gear is completed, then the control unit 1 proceeds to STEP140. The control unit 1 determines in STEP140 whether the Mode 1·2 flag F_mode12 has been set.

If it is determined in STEP140 that the Mode 1·2 flag F_mode12 has been set (F_mode12=1), that is, if the Mode1 or Mode2 is being implemented, then the control unit 1 proceeds to STEP150 wherein it sets the shift-to-mode3 flag F_mode2 to 3 (F_mode2 to 3=1) and resets the Mode 1·2 flag F_mode 1·2 (F_mode12=0). The control unit 1 then proceeds to STEP142. If it is determined in STEP140 that the Mode 1·2 flag has been reset (F_mode12=0), that is, if Mode2 has already been finished, then the control unit 1 proceeds to STEP141 wherein it resets the shift-to-mode3 flag F_mode2 to 3 (F_mode2 to 3=0) before proceeding to STEP142.

In STEP142, the VPOLE_sc calculator 54 of the shift controller 50 sets VPOLE_sc to VPOLE_sc3 (=−0.7). In the next STEP143, the target position calculator 52 sets the target value Psc_cmd of the shift arm 11 in the shifting direction to Psc_end. This increases the level of disturbance suppressing capability of the shift controller 50 to prevent the shift arm 11 from overrunning a shift completion position Psc_end. The control unit 1 then proceeds from STEP143 to STEP130 wherein it ends the processing for calculating a rotational synchronization target value.

FIG. 19 shows a flowchart of the clutch control in STEP3 of FIG. 12. The control unit 1 first determines in STEP190 whether the current gear selection position NGEAR coincides with a gear selection target value NGEAR_cmd.

If it is determined that the current gear selection position NGEAR does not coincide with the gear selection target value NGEAR_cmd, that is, if the transmission 80 is in the process of a speed change or during the shifting/selecting operation, then the control unit 1 proceeds to STEP191 wherein it determines whether the clocking time tm_shift of the speed changing operation reference timer has exceeded the clutch OFF completion time TM_CLOFF.

If the clocking time tm_shift of the timer is below the clutch OFF completion time TM_CLOFF and the clutch assembly 82 is being turned off, then the control unit 1 proceeds from STEP191 to STEP192 wherein the control unit 1 sets a clutch slip rate target value SR_cmd at 100%. The control unit 1 then proceeds to STEP193 wherein it carries out the slip rate control, and proceeds to STEP194 to terminate the clutch control.

If, on the other hand, it is determined in STEP191 that the clocking time tm_shift on the timer exceeds the clutch OFF completion time TM_CLOFF, i.e., if the clutch OFF step has been completed, then the control unit 1 proceeds to STEP210 wherein it determines whether the clocking time tm_shift on the timer exceeds a speed change time TM_SCHG. If the clocking time tm_shift on the timer exceeds the speed change time TM_SCHG, that is, if it is determined that the shifting/selecting operation of the transmission 80 has been finished, then the control unit 1 proceeds to STEP220 wherein it sets the clutch slip rate SR_cmd to 0%. The control unit 1 then proceeds to STEP193 wherein it carries out the slip rate control, and proceeds to STEP194 to terminate the clutch control.

If, on the other hand, it is determined in STEP190 that the current gear selection position NGEAR coincides with the gear selection target value NGEAR_cmd, indicating that the speed changing operation on the transmission 80 has been completed, then the control unit 1 proceeds from STEP190 to STEP200 wherein it acquires a travel target slip rate SR_cmd_dr by applying a driving force index Udrv and a vehicle speed VP to the Udrv, VP/SR_cmd_dr map shown in FIG. 19.

In the subsequent STEP201, the control unit 1 sets the travel target slip rate SR_cmd_dr at the target slip rate SR_cmd, and then proceeds to STEP193 to carry out the slip rate control. The control unit 1 then proceeds to STEP194 to terminate the clutch control.

Next, the control unit 1 has the construction shown in FIG. 20 to carry out the slip rate control. Referring to FIG. 20, a slip rate controller 60 controls a clutch mechanism 61 composed of a clutch actuator 16 shown in FIG. 1 and the clutch assembly 82. The slip rate controller 60 determines a clutch stroke Pcl of the clutch assembly 82, which is changed by the clutch actuator 16, such that a clutch rotational speed NC of the clutch mechanism 61 coincides with a clutch rotational speed target value NC_cmd.

The slip rate SR between clutch discs (not shown) in the clutch assembly 82 changes according to the clutch stroke Pcl, and the driving force transmitted from the engine 81 shown in FIG. 1 to the input shaft 5 through the intermediary of the clutch assembly 82 increases or decreases accordingly. Hence, the clutch rotational speed NC can be controlled by changing the clutch stroke Pcl.

The slip rate controller 60 includes a target value filter 62 that performs filtering computation on the clutch rotational speed target value NC_cmd to calculate a filtering target value NC_cmd_f, and a response specifying control unit 63 that determines a clutch stroke Pcl, which is a control input value for the clutch mechanism 61, by using the response specifying control.

The response specifying control unit 63 models the clutch mechanism 61 according to equation (21) given below and includes an equivalent control input calculator 67 for calculating an equivalent control input Ueq_sr, a subtracter 64 for calculating a difference Enc between the filtering target value NC_cmd_f and the clutch rotational speed NC, a switching function value calculator 65 for calculating a value of a switching function σ_sr, a reaching law input calculator 66 for calculating a reaching law input Urch_sr, and an adder 68 for calculating the clutch stroke Pcl by adding the equivalent control input Ueq_sr and the reaching law input Urch_sr.

$$NC(k+1) = a1\_sr(k) \cdot NC(k) + b1\_sr(k) \cdot Pcl(k) + c1\_sr(k) \quad (21)$$

where $a1\_sr(k)$, $b1\_sr(k)$, and $c1\_sr(k)$: Model parameters in a k-th control cycle.

A target value filter 62 carries out filtering computation according to the following equation (22) using the clutch rotational speed target value NC_cmd so as to calculate the filtering target value NC_cmd_f.

$$NC\_cmd\_f(k) = POLE\_F\_sr \cdot NC\_cmd\_f(k-1) + (1 + POLE\_F\_sr) \cdot NC\_cmd(k) \quad (22)$$

where k: Control cycle number; NC_cmd_f(k): Filtering target value in a k-th control cycle; and POLE_F_sr: Target value filter coefficient.

The above equation (22) applies to a first-order lag filer. The filtering target value NC_cmd_f takes a value that converges, with a response delay, to the clutch rotational speed target value NC_cmd after a change when the change takes place in the clutch rotational speed target value NC_cmd. The degree of the response delay of the filtering target value NC_cmd_f with respect to the clutch rotational speed target value NC_cmd changes with a set value of the target value filter coefficient POLE_F_sr. If the clutch rotational speed target value NC_cmd remains constant, then the filtering target value NC_cmd_f will be equal to the clutch rotational speed target value NC_cmd.

The switching function value calculator 65 calculates the switching function value σ_sr according to the following equation (24) from a difference Enc_sr calculated by the subtracter 64 according to the following equation (23).

$$Enc\_sr(k) = NC(k) - NC\_cmd\_f(k) \quad (23)$$

$$\sigma\_sr(k) = Enc\_sr(k) + POLE\_sr \cdot Enc\_sr(k-1) \quad (24)$$

where σ_sr(k): Switching function value in k-th control cycle; and POLE_sr: Switching function setting parameter ($-1 < POLE\_sr < 0$).

The equivalent control input calculator 64 calculates an equivalent control input Ueq_sr according to an equation (25) given below. Equation (25) calculates the clutch stroke Pcl as an equivalent control input Ueq_sr(k) by applying σ_sr(k+1) = σ_sr(k) and substituting to the above equations (23), (21), and (22).

$$Ueq\_sr(k) = \frac{1}{b1\_sr(k)}\{(1 - a1\_sr(k) + POLE\_sr) \cdot NC(k) + \quad (25)$$

$$POLE\_sr \cdot NC(k-1) - c1\_sr(k) +$$

$$NC\_cmd\_f(k+1) + (POLE\_sr - 1) \cdot$$

$$NC\_cmd\_f(k) - POLE\_sr \cdot NC\_cmd\_f(k-1)\}$$

where POLE_sr: Switching function setting parameter ($-1 < POLE\_sr < 0$); and a $1\_sr(k)$, $b1\_sr(k)$, c $1\_sr(k)$: Model parameters in a k-th control cycle.

A reaching law input calculator 66 calculates the reaching law input Urch_sr(k) according to an equation (26) given below. A reaching law input Urch_sr(k) is an input for placing a difference state amount (Enc_sr(k), Enc_sr(k-1)) on a switching straight line having the switching function σ_sr set as 0 (σ_sr(k)=0).

$$Urch\_sr(k) = -\frac{Krch\_sr}{b1\_sr(k)} \cdot \sigma\_sr(k) \quad (26)$$

where Urch_sr(k): Reaching law input in k-th control cycle; and Krch_sr: Feedback gain.

An adder 68 calculates the clutch stroke Pcl, which is a control input supplied to the clutch mechanism 61, according to the following equation (27).

$$Pcl(k) = Ueq\_sr(k) + Urch\_sr(k) \quad (27)$$

As shown in an equation (28) given below, an absolute value of the switching function setting parameter POLE_sr (a computing coefficient that determines the convergent speed of a difference between the filtering target value NC_cmd_f and the actual clutch rotational speed NC) is set to be smaller than an absolute value of the target filter coefficient POLE_F_sr (a computing coefficient that determines the speed at which the filtering target value NC_cmd_f converges to the clutch rotational speed target value NC_cmd in the filtering computation).

$$-1 < POLE\_F\_sr < POLE\_sr < 0 \quad (28)$$

Thus, a follow-up speed of the clutch rotational speed NC when the clutch rotational speed target value NC_cmd changes can be specified with relatively controlled influences of the switching function setting parameter POLE__sr. This makes it possible to further accurately specify a follow-up speed of the clutch rotational speed NC in response to a change in the clutch rotational speed target value NC__cmd by setting the target filter coefficient POLE__F__sr.

If the clutch rotational speed target value NC__cmd remains constant, then the filtering target value NC__cmd__f and the clutch rotational speed target value NC__cmd will be equal. Under the condition, if disturbance causes the clutch rotational speed NC to change, then the convergent behavior for a difference (NC-NC__cmd) between the clutch rotational speed NC and the clutch rotational speed target value NC__cmd can be set by the switching function setting parameter POLE__sr in the above equation (24).

Therefore, the slip rate controller 60 makes it possible to independently specify the follow-up speed of the actual clutch rotational speed NC with respect to the clutch rotational speed target value NC__cmd by setting the target filter coefficient POLE__F__sr in the above equation (22) when the clutch rotational speed target value NC__cmd changes. Moreover, the convergent speed of a difference between the clutch rotational speed target value NC__cmd and the actual clutch rotational speed NC can be independently set by setting the switching function setting parameter POLE__sr in the above equation (24).

An identifier 70 carries out processing for correcting the model parameters (a1__sr, b1__sr, and c1__sr) of the clutch mechanism 61 for each control cycle of the slip rate controller 60 so as to suppress influences of modeling errors from the above equation (21).

The identifier 70 calculates the model parameters (a1__sr, b1__sr, and c1__sr) of the above equation (21) according to equations (29) to (37). The above equation (21) can be represented in terms of the following equation (31) using a vector $\zeta\_sr$ defined by the following equation (29) and a vector $\theta\_sr$ defined by the following equation (30).

$$\zeta\_sr^T(k)=[NC(k-1)Pcl(k-1)1] \quad (29)$$

$$\theta\_sr^T(k)=[a1\_sr(k)b1\_sr(k)c1\_sr(k)] \quad (30)$$

$$NC\_hat(k)=\theta\_sr^T(k-1)\cdot\zeta\_sr(k) \quad (31)$$

where NC__hat(k): Estimated value of clutch rotational speed in k-th control cycle.

The identifier 70 first calculates, according to an equation (32) given below, a difference e__id__sr between a clutch rotational speed estimated value NC__hat obtained by the above equation (31) and the actual clutch rotational speed NC as the value representing a modeling error in the above equation (21). Hereinafter, the difference e__id__sr will be referred to as an identification error e__id__sr.

$$e\_id\_sr(k)=NC(k)-NC\_hat(k) \quad (32)$$

where e__id(k): Difference between clutch rotational speed estimated value NC__hat(k) and actual clutch rotational speed NC(k) in a k-th control cycle.

Then, the identifier 70 calculates P__sr, which denotes a tertiary square matrix, according to a recurrence formula of the following equation (33), and then calculates a tertiary vector KP__sr, which is a gain coefficient vector specifying the degree of change based on the identification error e__id__sr, according to the following equation (34).

$$P\_sr(k+1) = \frac{1}{\lambda_1\_sr}\left\{I - \frac{\lambda_2\_sr\cdot P\_sr(k)\cdot \varsigma\_sr(k)\cdot \varsigma\_sr^T(k)}{\lambda_1\_sr+\lambda_2\_sr\cdot \varsigma\_sr^T(k)\cdot P\_sr(k)\cdot \varsigma\_sr(k)}\right\}\cdot P\_sr(k) \quad (33)$$

where I: Unit matrix; and $\lambda\_sr_1$, $\lambda\_sr_2$: Identification weighting parameters.

$$KP\_sr(k) = \frac{P\_sr(k)\cdot \varsigma\_sr(k)}{1+\varsigma\_sr^T(k)\cdot P\_sr(k)\cdot \varsigma\_sr(k)} \quad (34)$$

The identifier 70 calculates a parameter correction value $d\theta\_sr$ according to an equation (36) given below, using a predetermined reference parameter $\theta base\_sr$ defined by an equation (35) given below, the value of KP__sr calculated according to the above equation (34), and the value of e__id__sr calculated according to the above equation (32).

$$\theta base\_sr^T(k)=[a1base\_sr\ b1base\_sr0] \quad (35)$$

$$d\theta\_sr(k)=d\theta sr(k-1)+KP\_sr(k)\cdot e\_id\_sr(k) \quad (36)$$

Then, the identifier 70 uses the following equation (37) to calculate a new model parameter $\theta\_sr^T(k)=[a1\_sr\ b1\_sr\ c1\_sr]$.

$$\theta\_sr(k)=\theta base\_sr(k)+d\theta\_sr(k) \quad (37)$$

FIG. 21 shows the flowchart of the slip rate control conducted in STEP193 of FIG. 19. The control unit 1 first calculates the clutch rotational speed target value NC__cmd according to the following equation (38) in STEP230.

$$NC\_cmd(k) = \frac{NE(k)\cdot(100-SR\_cmd)}{100} \quad (38)$$

where NC__cmd(k): Clutch rotational speed target value in k-th control cycle; NE(k): Engine speed in k-th control cycle; and SR__cmd: Target slip rate.

Subsequent STEP231 through STEP234, and STEP240 indicate the processing implemented by the identifier 70 to identify the model parameters a 1__sr, b 1__sr, and c 1__sr of the clutch mechanism 61. In STEP231, the identifier 70 applies the clutch rotational speed NC to the NC/a 1base__sr map shown in FIG. 21 to acquire a reference parameter a1base__sr(k) and also applies the clutch position Pcl to the Pcl/b1base__sr map given in the figure to acquire a reference parameter b1base__sr(k).

If it is determined in the next STEP232 that the clutch stroke Pcl has not exceeded a clutch OFF position Pcloff, which means that the clutch assembly 82 is not in the OFF state, then the identifier 70 proceeds to STEP233 wherein it calculates a correction value $d\theta\_sr$ of a model parameter according to the above equation (36) before it proceeds to STEP234.

If, on the other hand, it is determined in STEP232 that the clutch stroke Pcl has exceeded the clutch OFF position Pcloff, which means that the clutch assembly 82 is in the OFF state, then the identifier 70 proceeds to STEP240 without updating the correction value $d\theta\_sr$ of the model parameter. This arrangement makes it possible to prevent the correction value $d\theta\_sr$ of the model parameter from increasing if the clutch rotational speed NC in the clutch OFF state does not reach zero (the target clutch rotational speed NC__cmd based on the target slip rate 100%) while the speed changing operation is being performed.

In the subsequent STEP234, the identifier 70 calculates model parameter identification values (a1__sr(k), b1__sr(k), and c1__sr(k)) according to the above equation (37). In STEP235, the slip rate controller 60 operates the subtracter 64, the switching function value calculator 65, the reaching law input calculator 66, the equivalent control input calculator 67, and the adder 68 to carry out computation according to the above equations (22) to (27) so as to determine the clutch stroke control input value Pcl(k) supplied to the clutch mechanism 61. The identifier 70 then proceeds to STEP236 wherein it terminates the processing of the slip rate control.

In the present embodiment, the shift controller 50 and the selection controller 51 have used the sliding mode control as the response specifying control in the present invention. Alternatively, however, other types of response specifying control, such as back-stepping control, may be used.

The present embodiment has shown an example wherein the present invention has been applied to the control of the shifting operation and the selecting operation of the transmission 80. The present invention, however, can be applied to any types of mechanisms adapted to position a control object in two axial directions by operating an actuator provided for each axis.

What is claimed is:

1. An actuator control system comprising:

a first actuator for moving an object under control in the direction of a first axis;

first controlling means for carrying out first positioning control whereby to position the object under control at a target position on the first axis by operating the first actuator, by using response specifying control wherein a behavior for attenuating a difference between a target position and an actual position of the object under control and a speed of the attenuation can be variably specified so as to match the target position and the actual position of the object under control, and by determining a manipulated variable for driving the first actuator so as to converge a value of a switching function, which is specified by a linear function based on at least the difference, to zero;

a second actuator for moving the object under control in the direction of a second axis that has a predetermined angle with respect to the first axis; and second controlling means for carrying out second positioning control whereby to position the object under control at a target position on the second axis by operating the second actuator, wherein, when the object under control is moved to the target position on the second axis by carrying out the second positioning control while the object under control has been positioned at the target position on the first axis by the first positioning control, the first controlling means sets a computing coefficient of the linear function in the first positioning control such that a disturbance suppressing capability level becomes lower than that when the object under control is moved to the target position on the first axis by the first positioning control while the object under control has been positioned at the target position on the second axis by the second positioning control.

2. The actuator control system according to claim 1, wherein the second controlling means carries out the second positioning control by using response specifying control wherein a behavior for attenuating a difference between a target position and an actual position of the object under control and a speed of the attenuation can be variably specified so as to match the target position and the actual position of the object under control, and by determining a manipulated variable for driving the second actuator so as to converge a value of a switching function, which is specified by a linear function based on at least the difference, to zero;

and when the object under control is moved to a target position on the first axis by the first positioning control while the object under control has been positioned at the target position on the second axis by the second positioning control, the second controlling means sets a computing coefficient of the linear function in the second positioning control such that a disturbance suppressing capability level becomes lower than that when the object under control is moved to the target position on the second axis by the second positioning control while the object under control has been positioned at the target position on the first axis by the first positioning control.

3. The actuator control system according to claim 1 or 2, wherein the object under control is a shift arm that is provided in a transmission, actuated for a selecting operation and a shifting operation, and selectively engaged with a shift piece secured to each of shift forks for a plurality of speeds by the selecting operation, and displaces a shift fork associated with the selectively engaged shift piece from a neutral position by the shifting operation so as to establish a predetermined speed, the first axis indicates the direction of the selecting operation of the shift arm, the first controlling means positions the shift arm at a selected position of speed by the first positioning control, the second axis indicates the direction of the shifting operation of the shift arm, and the second controlling means positions the shift arm at a neutral position and a shift position by the second positioning control.

4. The actuator control system according to claim 3, wherein when the shift arm is moved from the neutral position to a shift position by the second positioning control while the shift arm has been positioned at a selected position of speed by the first positioning control, the second controlling means changes the computing coefficient of the linear function in the second positioning control according to the position of the shift arm.

* * * * *